United States Patent [19]
Harima et al.

[11] Patent Number: 6,023,645
[45] Date of Patent: Feb. 8, 2000

[54] TRAJECTORY CONTROL APPARATUS AND TRAJECTORY CONTROL METHOD FOR INTRA-PLANAR MULTIFREEDOM SCARA TYPE OF ROBOT, AND COMPUTER-READABLE RECORDING MEDIUM WITH TRAJECTORY CONTROL PROGRAM FOR INTRA-PLANAR MULTIFREEDOM SCARA TYPE OF ROBOT STORED THEREIN

[75] Inventors: Taro Harima; Masanori Iwashita, both of Nagoya, Japan

[73] Assignee: Mitsubishi Denki Kabushiki Kaisha, Tokyo, Japan

[21] Appl. No.: 08/975,045

[22] Filed: Nov. 20, 1997

[30]     Foreign Application Priority Data

May 15, 1997   [JP]   Japan ................................. 9-126110

[51] Int. Cl.⁷ ................................................ G05G 15/00
[52] U.S. Cl. ..................................... 700/250; 700/252
[58] Field of Search ........................... 395/97, 86; 901/6, 901/12, 22, 15; 318/568.11, 568.18; 700/250, 262, 248, 259, 263

[56]        References Cited

U.S. PATENT DOCUMENTS

| | | | |
|---|---|---|---|
| 4,594,671 | 6/1986 | Sugmoto et al. | 700/69 |
| 4,683,543 | 7/1987 | Hirasawa et al. | 364/513 |
| 4,722,063 | 1/1988 | Yasukawa et al. | 364/513 |
| 5,371,836 | 12/1994 | Mitomi et al. | 395/80 |
| 5,668,453 | 9/1997 | Muto et al. | 318/568.17 |
| 5,737,500 | 4/1998 | Seraji et al. | 395/86 |
| 5,781,705 | 7/1998 | Eudo | 395/97 |
| 5,811,951 | 9/1998 | Young | 318/568.2 |
| 5,867,631 | 2/1999 | Sato et al. | 395/97 |

*Primary Examiner*—Paul P. Gordon
*Assistant Examiner*—Kidest Bahta
*Attorney, Agent, or Firm*—Sughrue, Mion, Zinn, Macpeak & Seas, PLLC

[57]              ABSTRACT

In a trajectory control method for an intra-planar multifreedom SCARA type of robot, a positional increment for an arm tip is computed for a linear interpolating operation through the expression described below. Namely, the expression is $Vn = L_1 \cdot \sin(\theta_2) \cdot J_1$, wherein $Vn$ indicates a positional increment of an arm tip; $L_1$ indicates a length of a first arm; $\theta_2$ indicates an angle of a second joint; and $J_1$ indicates an angular velocity of a first joint (instructed angular velocity) specified by a user.

7 Claims, 17 Drawing Sheets

TRAJECTORY CONTROL APPARATUS AND TRAJECTORY CONTROL METHOD FOR INTRA-PLANAR MULTIFREEDOM SCARA TYPE OF ROBOT, AND COMPUTER-READABLE RECORDING MEDIUM WITH TRAJECTORY CONTROL PROGRAM FOR INTRA-PLANAR MULTIFREEDOM SCARA TYPE OF ROBOT STORED THEREIN

FIELD OF THE INVENTION

The present invention relates to a trajectory control apparatus and a trajectory control method for a SCARA type of robot as well as to a computer-readable recording medium with a trajectory control program for a SCARA type of robot stored therein, and more specifically to a trajectory control apparatus and a trajectory control method for an intra-planar multifreedom SCARA type of robot for a linear interpolating operation as well as to a computer-readable recording medium with a trajectory control program for an intra-planar multifreedom SCARA type of robot stored therein.

BACKGROUND OF THE INVENTION

Trajectory control by means of linear interpolation in the robot control is to provide controls so that a trajectory of a tip of a robot arm is a straight line with the velocity pattern like, for instance, a trapezoid.

FIG. 7 shows an intra-planar two-freedom SCARA type of robot. A freedom SCARA type of robot 20 has a first arm 24 which can rotate on a plane (X-Y plane) around a first joint shaft 21, and a second arm 25 which can rotate on a plane (X-Y plane) around a second joint shaft 22; wherein a tip (arm tip) 27 of the second arm 25 is a coordinate point as an object for robot control.

FIG. 8 shows a robot control apparatus using a microcomputer. The robot control apparatus comprises a central processing unit 1, an I/O interface 4 connecting an input device 2 and an output device 3 to the central processing unit 1, a memory 5, a servo amplifier interface 6, and an encoder interface 7. The memory 5 includes a control program storing area 8, an arm tip position storing area 9, a joint angle storing area 10, an end-point position storing area 11, and an arm length storing area 12.

Connected to the servo amplifier interface 6 is a servo amplifier 31 for driving servo motors provided in each joint shaft for driving each arm of a robot 20, and a joint encoder 32 provided in each joint shaft for detecting an angle of each arm of the robot 20 is connected to the encoder interface 7.

Next description is made for a trajectory control method based in the conventional technology for a SCARA type of robot by means of linear interpolation with reference to FIG. 9. At first, the central processing unit 1 starts linear interpolation (step S101). The sequence for this linear interpolation is called out from an operating sequence such as planning of works for upper equipment. When this sequence is called out, a current position and a final target position are decided through an operating sequence in the upper equipment.

When linear interpolation is started, at first a positional increment for an arm tip is obtained from a start position and an end position of a path for linear interpolation and a specified velocity each stored in the memory 5 (step S102). This arm tip position increment is obtained by multiplying the specified velocity by a sampling time as a positional increment in a direction from the start point to end point of the arm tip position at each sampling time.

Then, an arm tip position to be reached at the next sampling time is obtained by adding the arm tip position increment obtained in step S102 to an arm tip position at a current point of time stored in the arm tip position storing area 9 provided in the memory 5 (step S103). Then, an angle of each joint at the next sampling time is obtained by executing reverse conversion for the joint-arm tip position from the arm tip position at the next sampling time obtained in step S103 (step S104).

Then, an angular velocity of joint to move at the current sampling time is obtained by subtracting a current joint angle stored in the joint angle storing area 10 provided in the memory 5 from the angle of each joint at the next sampling time obtained in step S104 (step S105). Then, the joint angle to be driven obtained in step S105 is given to a servo amplifier 31 through the servo interface 6 to drive servo motors provided in each joint of the robot 20 (step S106).

Then, a joint angle of each arm is detected by a joint encoder 32 provided in each joint of the robot 20 through the encoder interface 7 when the next sampling time has come, and the value of the joint angle each of current arm in the joint angle storing area 10 is updated (step S107). Then, a current arm tip position is obtained by executing regular conversion for a joint angle-an arm point position from the current joint angle (step S108).

Then, a value of the arm tip position written in the arm tip point storing area 9 provided in the memory 5 is updated by the current arm tip position obtained in step S108 (step S109). Then, the coordinates of the end position stored in the end position storing area 11 provided in the memory 5 are compared to those of the current arm tip position obtained in step S108 (step S10). If the current position has reached the end position, the processing is branched to End (step S111), while if not, the processing is branched to step S103 to execute again the subsequent steps thereto.

Next description is made for concrete operations of the two-freedom SCARA type of robot with reference to the explanatory view of operations shown in FIG. 10 as well as to the graphs shown in FIG. 11 and FIG. 12.

Herein, specifications of the two-freedom SCARA type of robot are set as follows:

Length of the first arm $L_1$: 320 mm

Length of the second arm $L_2$: 320 mm

First joint-maximum rated angular velocity: 4.12 rad/sec

Second joint-maximum rated angular velocity: 4.12 rad/sec

Sampling time: 28.4 msec

FIG. 10 shows a case where the robot is operated with linear interpolation from a point of 500 mm in the X coordinate and −100 mm in the Y coordinate (a start position) to a point of −500 mm in the X coordinate and −100 mm in the Y coordinate (an end position) in parallel to the X-axis. FIG. 10 shows a state (posture) of the robot arm at each 0.284 sect namely, or at each 10 sampling time when an arm tip position velocity is 390 mm/sec, namely a positional increment for the arm tip for each sampling time is 11 mm. Herein, a velocity is selected so that an operating speed of a joint is the highest within a range not exceeding the maximum rating.

As shown in FIG. 10, the first shaft (first joint shaft 21) at first moves in the counterclockwise direction from the start position (X coordinate: 500 mm; Y coordinate: −100 mm) to the arm state indicated by the reference character R, namely to the posture in which the second arm 25 and the direction of movement thereof form a right angle. The first shaft moves in the clockwise direction from this position to the end position (X coordinate: −500 mm; Y coordinate: −100 mm). The rotating direction of the first shaft is reversed at this R point (a point of an arm state). Namely, the point R is a rocking point of a slider crank mechanism comprising the first shaft, first arm 24, second shaft (second joint shaft 22), second arm 25, arm tip, and linear path.

FIG. 11 is a state diagram in which the X-axis indicates an X coordinate of an arm tip and the Y-axis indicates an positional increment for an arm tip at a sampling time, an angle of the first shaft, and an angular velocity of the first shaft. In FIG. 11, designated at the reference pattern of a black circle "●" is an angle of the first shaft, at a white square "□" an angular velocity of the first shaft, and at a black triangle "▲" a positional increment for an arm tip at each sampling time in the tip of the shaft respectively.

FIG. 12 is a state diagram in which the X-axis indicates a sampling time and the Y-axis indicates, as shown in FIG. 11, a positional increment for an arm tip, an angle of the first shaft, and an angular velocity of the first shaft at the sampling time. In FIG. 12, designated at the reference pattern of a black circle "●" is an angle of the first shaft, at a white square "□" an angular velocity of the first shaft, and at a black triangle "▲" a positional increment for an arm tip at each sampling time in the tip of the shaft respectively.

It is found from FIG. 11 that an angular velocity of the first shaft is a maximum at the point of time when the arm tip position has come close to the origin, namely at the point of time when the X coordinate has approached zero. At this point of time, an instructed velocity is restricted so that the angular velocity of the first shaft does not exceed the maximum rating. For this reason, the first shaft is used only by around a half of the capability at points other than those adjacent to the point of X=0 mm.

It is one of very important objects for controlling that a velocity of an arm tip is kept constant when the SCARA type of robot carries out works suited for CP control (Continuous Path control) such as painting work.

However, it is not always an indispensable condition that a trajectory of an arm tip is a straight line and also a velocity is kept constant when the SCARA type of robot is used in assembly operations of which main operation is to control picking and placing. It is rather strongly required that linear operation from a start position to an end position is executed for a short period of time to enhance efficiency of the operation. In this case, it is preferred to improve the operability by making the best use of capability of the first joint shaft 21 but not to keep constant a velocity of an arm tip of the SCARA type of robot.

From the above description, a linear interpolation control method is conceivable for operation at a high velocity with the first joint shaft 21 of which angular velocity is constant by making the best use of capability of a servo motor to drive the first joint shaft 21.

Description is made for a method of controlling linear interpolation in which an arm tip is operated on a straight line by keeping an angular velocity of the first joint shaft 21 to be constant with reference to FIG. 13.

Linear interpolation is started (step S101). The sequence for this linear interpolation is called out, for instance, from an operating sequence such as work plan for upper equipment. When this sequence is called out, a current position and a final target position are decided through an operating sequence in the upper equipment. An angular velocity of the first joint in the linear interpolating operation is given through an operating sequence in the upper equipment. When linear interpolation is started, a positional increment for an arm tip is obtained under the condition in which the angular velocity of the first joint is constant (step S112).

A relation between time differentiation for an arm tip position (X, Y) of the two-freedom SCARA type of robot shown in FIG. 7, namely a velocity of an arm tip position and time differentiation for a joint angle $(\theta_1, \theta_2)$, namely an angular velocity of the joint is expressed by the expression (2). Wherein J indicates Jacobean matrix expressed by the expression (3).

$$\frac{d}{dt}\begin{pmatrix} X \\ Y \end{pmatrix} = J\frac{d}{dt}\begin{pmatrix} \theta_1 \\ \theta_2 \end{pmatrix} \quad (2)$$

$$J = \begin{pmatrix} -L_1\sin(\theta_1) - L_2\sin(\theta_1 + \theta_2) & -L_2\sin(\theta_1 + \theta_2) \\ -L_1\cos(\theta_1) - L_2\cos(\theta_1 + \theta_2) & -L_2\cos(\theta_1 + \theta_2) \end{pmatrix} \quad (3)$$

This reversed relation is expressed by the expression (4).

$$\frac{d}{dt}\begin{pmatrix} \theta_1 \\ \theta_2 \end{pmatrix} = Jr\frac{d}{dt}\begin{pmatrix} X \\ Y \end{pmatrix} \quad (4)$$

Herein Jr indicates reversed Jacobean matrix expressed by the expression (5).

$$Jr = \frac{1}{L_1\sin(\theta_2)}\begin{pmatrix} \cos(\theta_1 + \theta_2) & \sin(\theta_1 + \theta_2) \\ -\cos(\theta_1) - \cos(\theta_1 + \theta_2) & -\sin(\theta_1) - \sin(\theta_1 + \theta_2) \end{pmatrix} \quad (5)$$

The expression (4) is a binomial simultaneous equations. Through this first expression, a relation between the angular velocity of the first shaft and a velocity of an arm tip position is expressed by the expression (6).

$$\frac{d\theta_1}{dt} = \frac{\cos(\theta_1 + \theta_2) \cdot \frac{dx}{dt} + \sin(\theta_1 + \theta_2) \cdot \frac{dy}{dt}}{L_1 \cdot \sin(\theta_2)} \quad (6)$$

wherein $J_1$ indicates an angular increment for the first shaft at each sampling time, Vx indicates a positional increment for an arm tip in the X-axial direction, and Vy indicates a positional increment in the Y-axial direction. A relation between the angular increment $J_1$ and positional increments Vx, Vy of an arm tip is expressed by the expression (7).

$$J_1 = \frac{\cos(\theta_1 + \theta_2) \cdot Vx + \sin(\theta_1 + \theta_2) \cdot Vy}{L_1 \cdot \sin(\theta_2)} \quad (7)$$

As shown in FIG. 14, it is assumed that P indicates a current position, E indicates an end position, and an arm tip is operated along the straight line PE. It is assumed that Vn indicates a positional increment for an arm tip in the current position P, Vx indicates an increment in the X-axial direction, and Vy indicates an increment in the Y-axial direction. It is also assumed that Dn indicates a remaining distance to be moved from a current position P to an end position E, Prx indicates an element of the remaining distance in the X direction, and Pry indicates an element of the remaining distance in the Y direction.

As shown in FIG. 14, there is the relation shown in the expression (8) between the remaining distance Dn, Prx and the increments to be moved Vn, Vx because a right triangle with the line segment PE as the hypotenuse and that with the vector Vn for the positional increment as the hypotenuse are similar to each other.

$$\frac{Dn}{Prx} = \frac{Vn}{Vx} \tag{8}$$

Accordingly, a relation indicated by the expression (9) holds good. Similarly the expression (10) also holds good for the element in the Y-axial direction.

$$Vx = \frac{Prx}{Dn} \cdot Vn \tag{9}$$

$$Vy = \frac{Pry}{Dn} \cdot Vn \tag{10}$$

If the expression (9) and the expression (10) are substituted into the expression (7), the expression (11) holds good.

$$J_1 = \frac{\cos(\theta_1 + \theta_2) \cdot Prx + \sin(\theta_1 + \theta_2) \cdot Pry}{L_1 \cdot \sin(\theta_2)} \cdot \frac{Vn}{Dn} \tag{11}$$

When the positional increment Vn of an arm tip in the expression (11) is solved, the expression (12) holds good.

$$Vn = \frac{Dn \cdot L_1 \cdot \sin(\theta_2) \cdot J_1}{Prx \cdot \cos(\theta_1 + \theta_2) + Pry \cdot \sin(\theta_1 + \theta_2)} \tag{12}$$

A positional increment Vn for an arm tip for controlling the arm tip is obtained in a linear trajectory under the condition of an angular velocity of the first shaft to be constant by substituting an instructed angular velocity of the joint into the angular increment $J_1$ of the first shaft in the expression (12). By substituting a positional increment Vn for an arm tip into the expressions (9) and (10), an increment for positional coordinates for the arm tip is obtained.

As described above, when a positional increment has been obtained, the positional increment obtained as described above is added to the positional coordinates for the arm tip stored in the arm tip position storing area 9 provided in the memory 5, then an arm tip position to be reached at the next sampling time is obtained (step 5103).

Step S104 to step S111 in the flowchart shown in FIG. 13 is the same as that shown in FIG. 9 for controlling linear interpolation at a constant velocity of the arm tip, so that description thereof is omitted herein.

Next description is made for concrete operations of the SCARA type of robot with reference to an explanatory view of the operations shown in FIG. 15 and graphs shown in FIG. 16 and FIG. 17. It is assumed that the specifications of the SCARA type of robot are the same as those described above.

FIG. 15 shows, as a concrete example of the operations, a case where the robot is operated by linear interpolation from a position (a starting position) at X coordinate: 500 mm; Y coordinate: −100 mm to a position (an end position) at X coordinate: −500 mm; Y coordinate: −100 mm in parallel to the X-axis. FIG. 15 shows the robot arm for each 0.284 sec, namely for each 10 sampling time in a case where the angular velocity of the first shaft is 2.3 rad/sec. Herein, the highest velocity within a range in which the operating velocity of a shaft does not exceed the maximum rating is selected.

As shown in FIG. 15, the first shaft at first moves in the counterclockwise direction from the start position (X coordinate: 500 mm; Y coordinate: −100 mm) to the arm state indicated by the reference character R; namely to the posture in which the second arm 25 and the direction of movement thereof form a right angle. The first shaft moves in the clockwise direction from this state to the end position (X coordinate: −500 mm; Y coordinate: −100 mm). The rotating direction of the first shaft is reversed at this R point. Namely, the R point is a rocking point of a slider crank mechanism comprising the first shaft, first arm 24, second shaft, second arm 25, arm tip, and linear path.

FIG. 16 is a state diagram in which the X-axis indicates an X coordinate of an arm tip and the Y-axis indicates an positional increment for an arm tip at a sampling time, an angle of the first shaft, and an angular velocity of the first shaft. In FIG. 16, designated at the reference pattern of a black circle "●" is an angle of the first shaft, at a white square "□" an angular velocity of the first shaft, and at a black triangle "▲" a positional increment for an arm tip at each sampling time in the arm tip of the shaft respectively.

FIG. 17 is a state diagram in which the X-axis indicates a sampling time and the Y-axis indicates, as shown in FIG.16, a positional increment for an arm tip, an angle of the first shaft, and an angular velocity of the first shaft at the sampling time. In FIG. 17, designated at the reference pattern of a black circle "●" is an angle of the first shaft, at a white square "□" an angular velocity of the first shaft, and at a black triangle "▲" a positional increment for an arm tip at each sampling time in the arm tip of the shaft respectively.

An angular velocity of the first shaft indicated by the white square "□" is operated at substantially constant angular velocity at adjacent to +2.3 rad/sec as far as the angular velocity reaches the rocking point at 232 mm in the X coordinate shown in FIG. 16, and is operated at substantially constant angular velocity at adjacent to −2.3 rad/sec when the angular velocity exceeds the rocking point.

In linear interpolating operation at a constant velocity at the arm tip position, the arm tip is moved requiring 2.56 sec for a segment of 1000 mm from the start position X coordinate: 500 mm; Y coordinate: −100 mm) to the end position (X coordinate: −500 mm; Y coordinate: −100 mm), but when it is controlled at a constant angular velocity, only 1.48 sec is required for completion of the movement.

In the method of linear interpolation at a constant velocity of an arm tip based on the conventional technology, it is impossible to further reduce a tact time (operating time) by making use of capability of the driving motor for joints, but it is possible to further reduce a tact time (operating time) by making use of capability of the driving motor for a joint if the method of controlling linear interpolation at a constant angular velocity of a joint as described above is employed.

In the method of controlling linear interpolation at a constant angular velocity of a joint as described above, however, a positional increment for the arm tip at a sampling time is decided by the expression (12), so that, when the denominator is zero at the rocking point at which the rotating direction of the joint shaft is reversed, a positional increment Vn of the arm tip is disadvantageously diverged to infinity.

For this reason, the line indicating the positional increment for the arm tip at each sampling time in the arm tip of the shaft indicated by the black triangle "▲" in FIG. 16 is diverged to infinity at the point adjacent to the rocking point (X=232 mm) in this robot.

The angular velocity of the first shaft indicated by the white square "□" rotates, affected by this divergence, twice as fast as a specified angular velocity. Conversely, because of this point, a specified angular velocity has to be reduced so as not to generate excess of the velocity over an expression for a maximum rated rotation, which is inconvenient.

SUMMARY OF THE INVENTION

It is an object of the present invention to obtain a trajectory control apparatus and a trajectory control method for an intra-planar multifreedom SCARA type of robot in which an arm tip is improved so as to pass through a rocking point without generation of an excessive velocity as well as to obtain a computer-readable recording medium with a trajectory control program for an intra-planar multifreedom SCARA type of robot stored therein.

With the present invention, a first joint angular velocity storing section stores therein an angular velocity of a first joint specified as a parameter for computing increment of an arm tip position, and an arm tip position increment computing section computes for a linear interpolating operation an arm tip position increment by multiplying a length of the first arm by a sine of an angle of a second joint and angular velocity of the first joint stored in the first joint angular velocity storing section to control linear interpolation. With this operation, there is no possibility that a positional increment for an arm tip becomes infinity over the whole operating area for linear interpolation.

It should be noted that, assuming that a positional increment for an arm tip is Vn, a length of a first arm is $L_1$, an angle of a second joint is $\theta_2$, and an angular velocity of a first joint is $J_1$, the positional increment computing section computes a positional increment Vn for an arm tip through the operating expression: $Vn = L_1 \cdot \sin(\theta_2) \cdot J_1$.

With the present invention, in a two-freedom or a three-freedom SCARA type of robot, the positional increment computing section computes for a linear interpolating operation an arm tip position increment by multiplying a length of the first arm by a sine of an angle of a second joint and angular velocity of the first joint stored in the first joint angular velocity storing section to control linear interpolation. With this operation, there is no possibility that a positional increment for an arm tip becomes infinity over the whole operating area for linear interpolation in the two-freedom or three-freedom SCARA type of robot.

With the present invention, linear interpolation is controlled by storing therein an angular velocity of a first joint specified as a parameter for computing an arm tip position increment, and by computing for a linear interpolating operation a positional increment for an arm tip by multiplying a length of a first arm by sine of an angle of a second joint and an angular velocity of the first joint. With this operation, there is no possibility that a positional increment for an arm tip becomes infinity over the whole operating area for linear interpolation.

With the present invention, linear interpolation is controlled by computing a positional increment Vn for an arm tip through the operating expression: $Vn = L_1 \cdot \sin(\theta_2) \cdot J_1$. With this operation, there is no possibility that a positional increment for an arm tip becomes infinity over the whole operating area for linear interpolation.

With the present invention, in a two-freedom or a three freedom SCARA type of robot, the positional increment computing section computes for a linear interpolating operation an arm tip position increment by multiplying a length of the first arm by a sine of an angle of a second joint and an angular velocity of the first joint to control linear interpolation. With this operation, there is no possibility that a positional increment for an arm tip becomes infinity over the whole operating area for linear interpolation in the two-freedom or three-freedom SCARA type of robot.

With the present invention, there is stored in a computer-readable recording medium a program for making a computer execute a first joint angular velocity storing step of storing a first joint angular velocity specified as a parameter for computing an arm tip position increment and an arm tip position increment computing step for computing for a linear interpolating operation an arm tip position increment by multiplying a length of the first arm by a sine of an angle of a second joint and angular velocity of the first joint stored in the first joint angular velocity storing section, and by making a computer execute the program stored in the recording medium, a linear interpolating operation is executed with no positional increment for an arm tip which becomes infinity over the whole operating area for linear interpolation.

Other objects and features of this invention will become understood from the following description with reference to the accompanying drawings.

DESCRIPTION OF THE PREFERRED EMBODIMENTS

Figure 1:
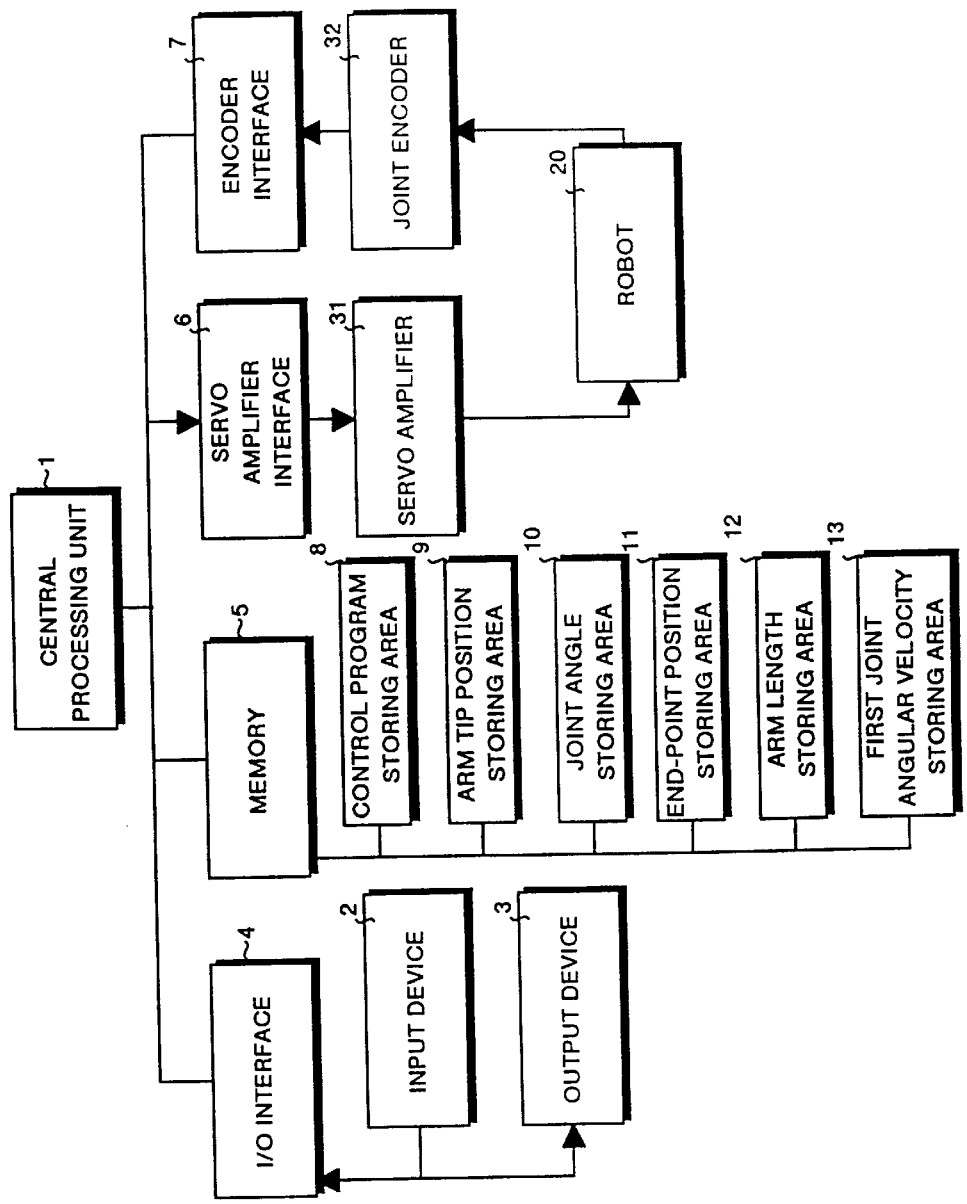
FIG. 1 is a block diagram showing one embodiment of a trajectory control apparatus for an intra-planar multifreedom SCARA type of robot according to the present invention.

Detailed description is made hereinafter for embodiments of the trajectory control apparatus and the trajectory control method for an intra-planar multifreedom SCARA type of robot for a linear interpolating operation as well as of the computer-readable recording medium with a trajectory control program for an intra-planar multifreedom SCARA type of robot stored therein according to the present invention with reference to the related drawings. It should be noted that, in the embodiments described later, the same reference numerals are assigned to the same sections corresponding to those in the example based on the conventional technology, and description thereof is omitted herein.

In the specification, "plane" is a plane such as a horizontal surface or a vertical surface, and an arm is moved within one plane such as this horizontal surface. Accordingly, all directions of the rotary shaft of the arm such including those in the vertical direction or the like are identical. Also, "multi-freedom" is the same meaning as multi-joint (articulated). A horizontally articulated type of robot is generally used, which is called a SCARA type. By the way, SCARA is an abbreviation of Selective Compliance Assembly Robot Arm.

FIG. 1 shows one embodiment of the trajectory control apparatus (robot control apparatus) according to the present invention. This trajectory control apparatus comprises a memory 5, a control program storing area 8, an arm tip position storing area 9, a joint angle storing area 10, an end-position storing area 11, an arm length storing area 12, and in addition, a first joint angular velocity storing area 13.

The first joint angular velocity storing area 13 stores therein an angular velocity of the first joint specifically inputted by a user as a parameter through an input device 2.

The positional increment computing section for an arm tip is realized by the central processing unit 1 which executes the control program stored in the control program storing area 8 in the memory 5, and computes for a linear interpolating operation an arm tip position increment by multiplying a length of the first arm by a sine of an angle of a second joint and angular velocity of the first joint (instruction for an angular velocity of the first shaft) stored in the first joint angular velocity storing area 13.

This computation is executed, assuming that a positional increment for an arm tip is Vn, a length of a first arm is $L_1$, an angle of a second joint is $\theta_2$, and an angular velocity of a first joint (instruction for an angular velocity of the first shaft) is $J_1$, through the operating expression:

$$Vn = L_1 \cdot \sin(\theta_2) \cdot J_1.$$

The input device 2 reads out the trajectory control program from a computer-readable recording medium with a trajectory control program stored therein for making a computer execute a first joint angular velocity storing step of storing a first joint angular velocity specified as a parameter for computing an arm tip position increment in the first joint angular velocity storing area 13 and an arm tip position increment computing step of computing for a linear interpolating operation an arm tip position increment by multiplying a length of the first arm by a sine of an angle of the second joint and angular velocity of the first joint stored in the first joint angular velocity storing area 13, and stores the read-out program in the control program storing area 8.

Figure 2:
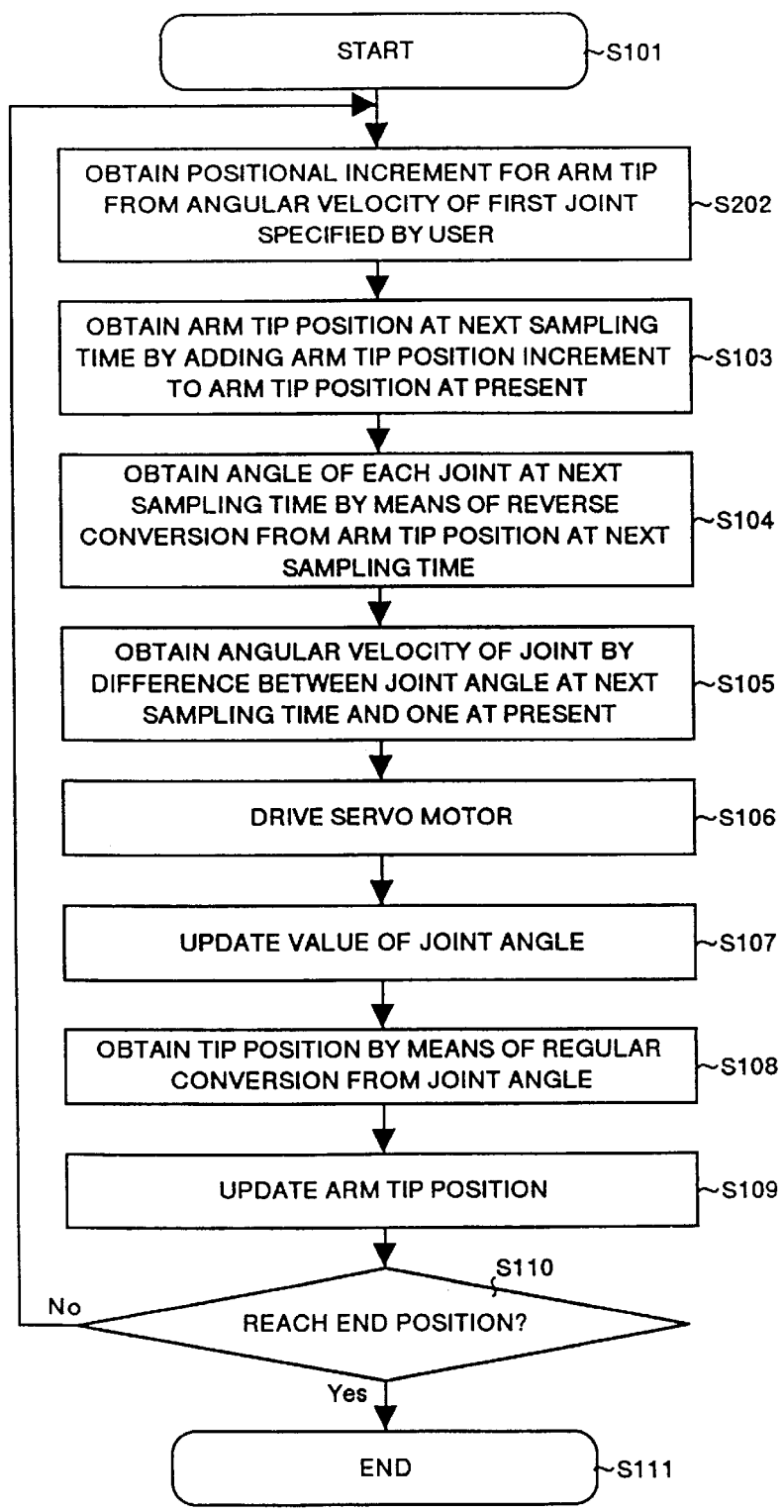
FIG. 2 is a flowchart showing one embodiment of a trajectory control method for an intra-planar multifreedom SCARA type of robot according to the present invention.

Next, description is made for the trajectory control method according to the present invention with reference to FIG. 2. The central processing unit 1 starts linear interpolation (step S101). The sequence for this linear interpolation is called out from an operating sequence such as planning of works for upper equipment. When this sequence is called out, a current position and a final target position are decided through an operating sequence in the upper equipment. Also, an angular velocity $J_1$ of the first joint in the linear interpolating operation is given through the upper equipment.

When linear interpolation is started, a positional increment Vn for an arm tip is computed and decided through the angular velocity $J_1$ of the first joint specified by a user and the expression (1) (step S202).

$$Vn = L_1 \cdot \sin(\theta_2) \cdot J_1 \tag{1}$$

wherein Vn indicates a positional increment of an arm tip; $L_1$ indicates a length of a first arm; $\theta_2$ indicates an angle of a second joint; and $J_1$ indicates an angular velocity of a first joint (instruction for an angular velocity of the first shaft) specified by a user.

Also, the expression (12) can be transformed into the expression (13).

$$Vn = \frac{L_1 \cdot \sin(\theta_2) \cdot J_1}{\frac{Prx \cdot \cos(\theta_1 + \theta_2) + Pry \cdot \sin(\theta_1 + \theta_2)}{Dn}} \tag{13}$$

The denominator in the expression (13) takes, in all the operating area, a value of zero or more and 1 or less. A positional increment for an arm tip is disadvantageously diverged to infinity at the rocking point because the section of this denominator becomes zero at the rocking point.

For this reason, the expression (1) is derived by fixing the denominator in the expression (13) to 1. The value of the expression (1) will never exceed a value of the expression (13). With this operation, in a case where an angle of a joint is obtained by executing reverse conversion from the arm tip position in step S105 and an increment of the joint angle is obtained in step S106, an increment for an angle smaller as compared to a case where operation is controlled at a constant angular velocity for the joint is decided. For this reason, even if the instructed angular velocity $J_1$ is set as a rated maximum angular velocity in the expression (1), any instruction for an angle of a joint exceeding the value will never be generated.

Figure 13:
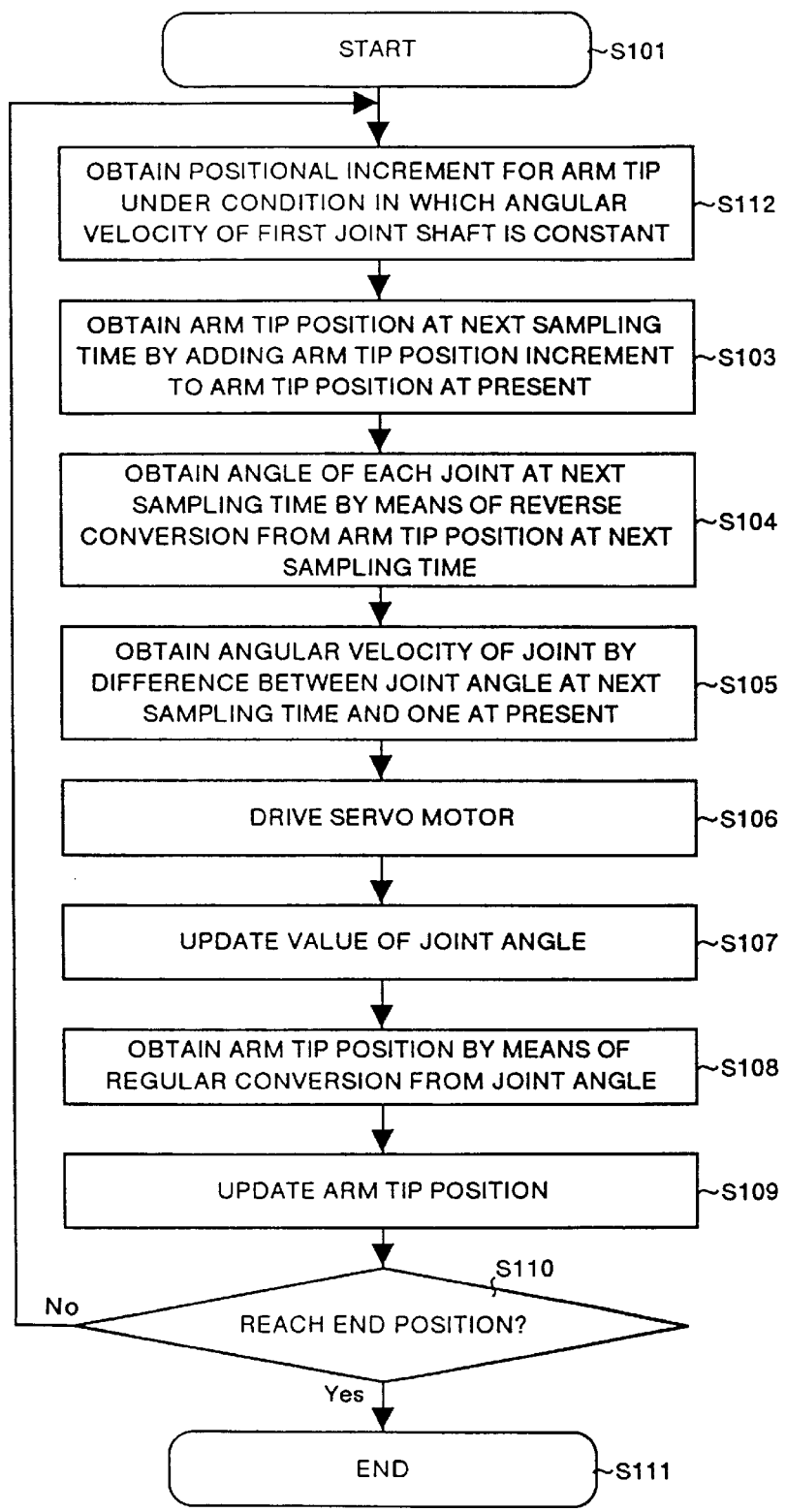
FIG. 13 is a flowchart showing a linear interpolating control of robot control by controlling an angular velocity to be constant.

Step S103 to step S111 in the flowchart in FIG. 2 are the same as those in the flowchart of the linear interpolating control at a constant angular velocity shown in FIG. 13, so that description thereof is omitted herein.

Figure 3:
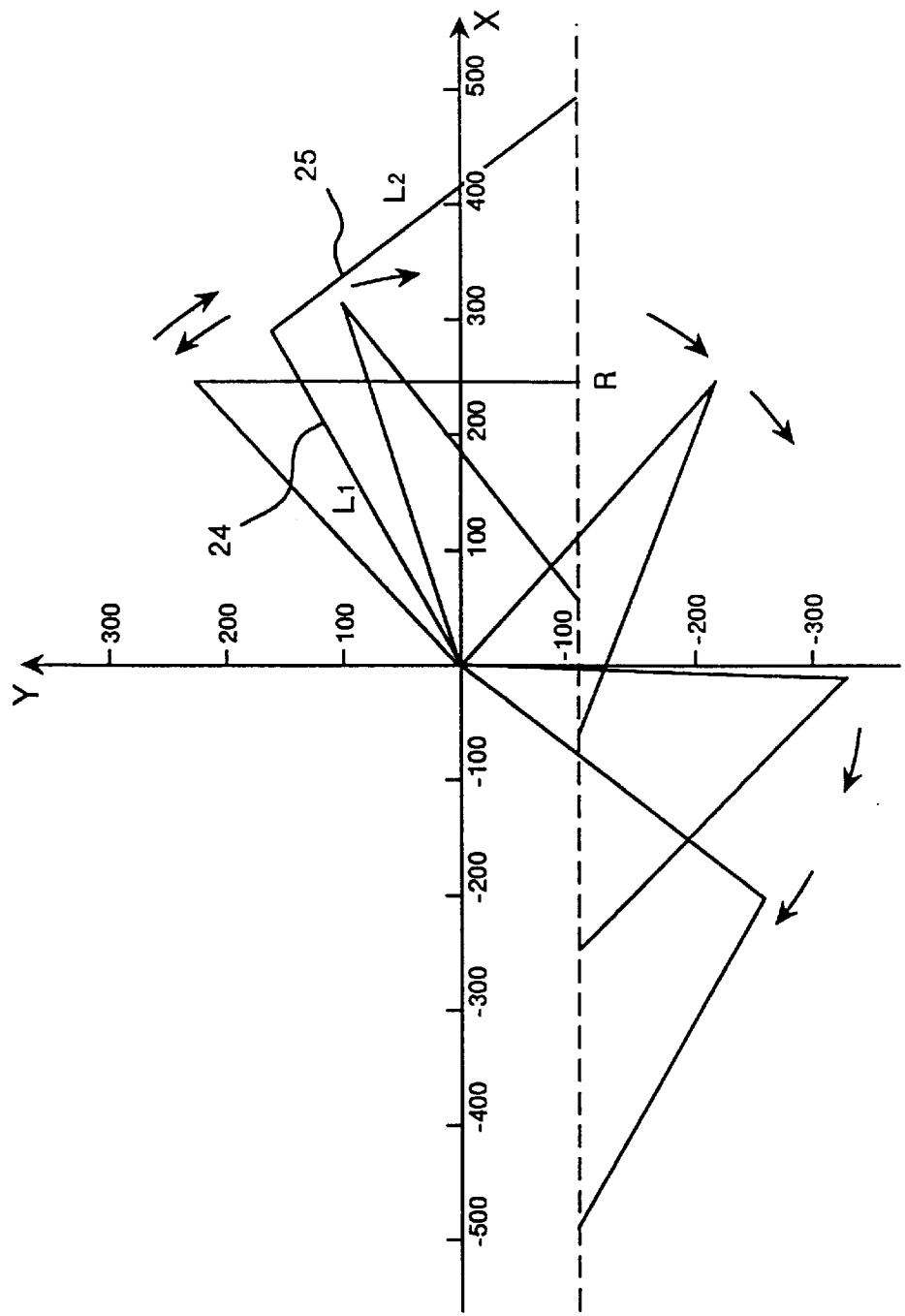
FIG. 3 is an explanatory view showing a path of an arm operation in trajectory control of the intra-planar multifreedom SCARA type of robot according to the present invention.
Figure 4:
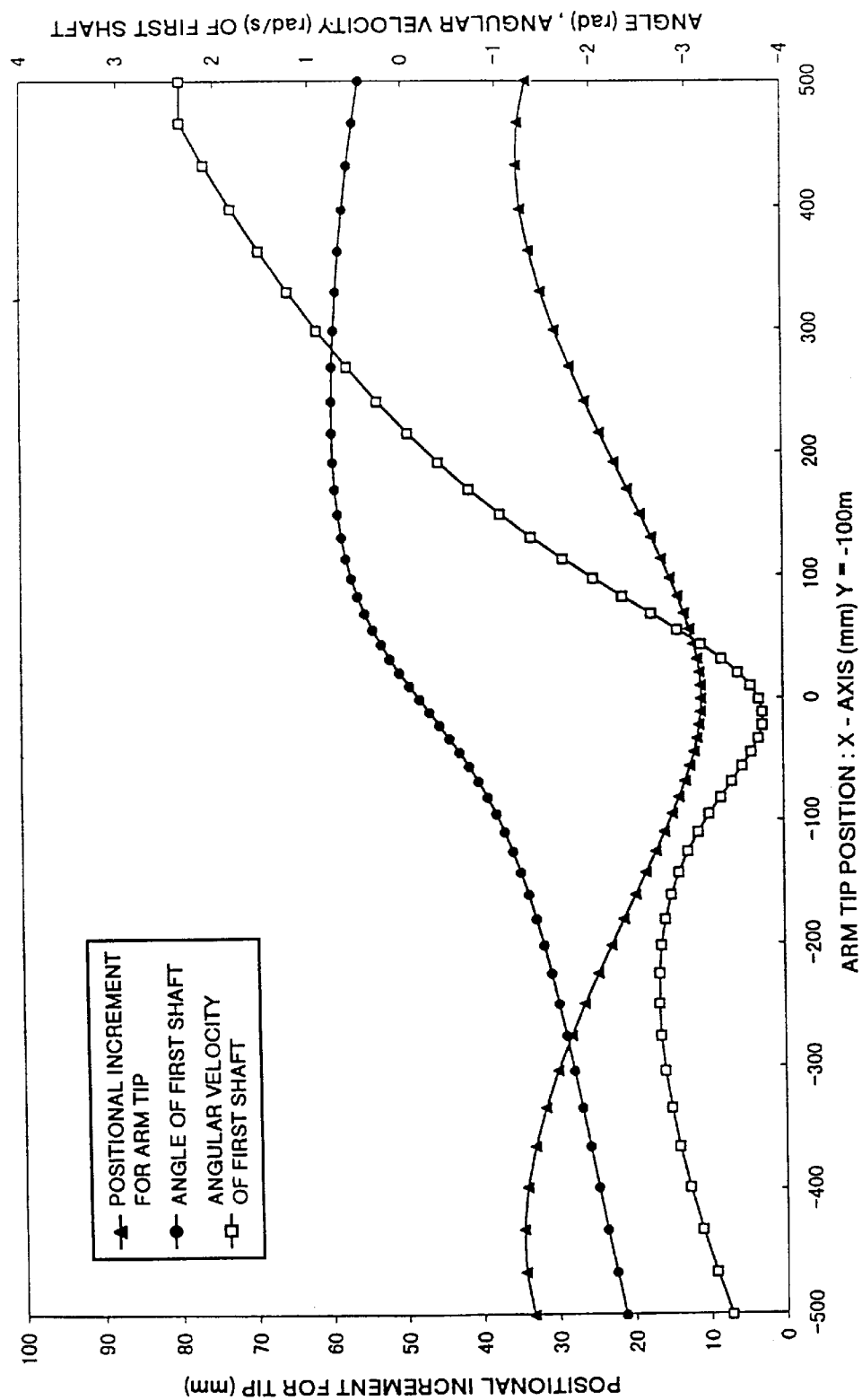
FIG. 4 is a graph showing an arm tip position increment, an angle of the first shaft, and an angular velocity of the first shaft to an arm tip position in trajectory control of the intra-planar multifreedom SCARA type of robot according to the present invention.
Figure 5:
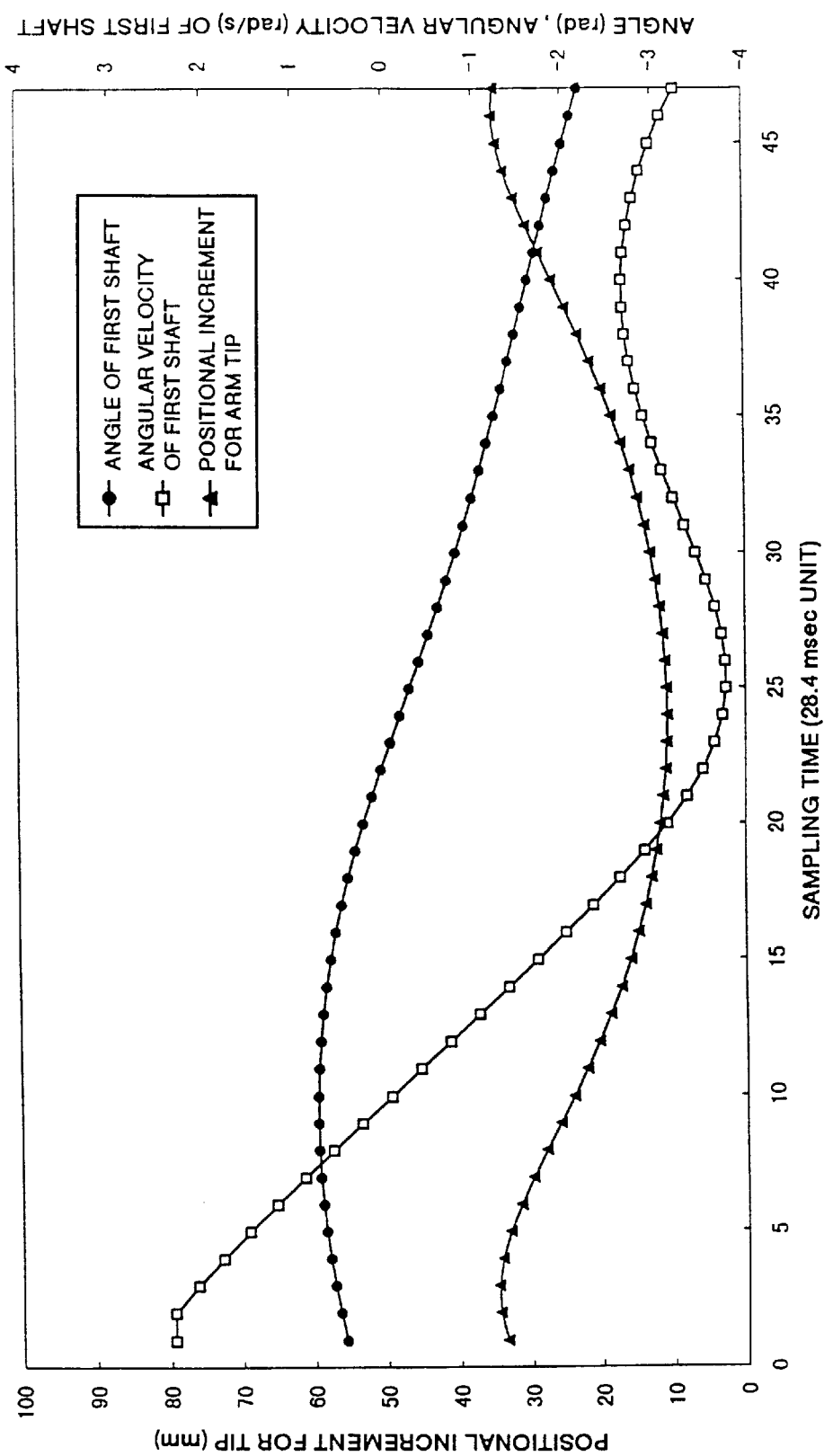
FIG. 5 is a graph showing an arm tip position increment, an angle of the first shaft, and an angular velocity of the first shaft to a sampling time in trajectory control of the intra-planar multifreedom SCARA type of robot according to the present inention.

Next description is made for concrete operations of the SCARA type of robot with reference to the explanatory view of operations shown in FIG. 3 as well as to the graphs shown in FIG. 4 and FIG. 5. It should be noted that it is assumed herein that specifications of the SCARA type of robot are the same as those described above.

FIG. 3 shows, as a concrete example of the operations, a case where the robot is operated by linear interpolation from a position (a starting position) at X coordinate: 500 mm; Y coordinate: –100 mm to a position (an end position) at X coordinate: –500 mm; Y coordinate: –100 mm in parallel to the X-axis. FIG. 3 shows the robot arm for each 0.284 sec, namely, for each 10 sampling time in a case where an instruction for an angular velocity of the first shaft is a rated maximum angular velocity of 4.12 rad/sec.

As shown in FIG. 3, the first shaft at first moves in the counterclockwise direction from the start position (X coordinate: 500 mm; Y coordinate: −100 mm) to the arm state indicated by the reference character R namely to the posture in which the second arm 25 and the direction of movement thereof form a right angle. The first shaft moves in the clockwise direction from this state to the end position (X coordinate: −500 mm; Y coordinate: −100 mm). The rotating direction of the first shaft is reversed at this R point. Namely, the R point is a rocking point of a slider crank mechanism comprising the first shaft, first arm 24, second shaft, second arm 25, arm tip, and linear path.

FIG. 4 is a state diagram in which the X-axis indicates an X coordinate of an arm tip and the Y-axis indicates an positional increment for the arm tip at a sampling time, an angle of the first shaft, and an angular velocity of the first shaft. In FIG. 4, designated at the reference pattern of a black circle "●" is an angle of the first shaft, at a white square "□" an angular velocity of the first shaft, and at a black triangle "▲" a positional increment for an arm tip at each sampling time in the arm tip of the shaft respectively.

FIG. 5 is a state diagram in which the X-axis indicates a sampling time and the Y-axis indicates, as shown in FIG. 4, a positional increment for an arm tip, an angle of the first shaft, and an angular velocity of the first shaft at the sampling time. In FIG. 5, designated at the reference pattern of a black circle "●" is an angle of the first shaft, at a white square "□" an angular velocity of the first shaft, and at a black triangle "▲" a positional increment for an arm tip at each sampling time in the arm tip of the shaft respectively.

Figure 16:
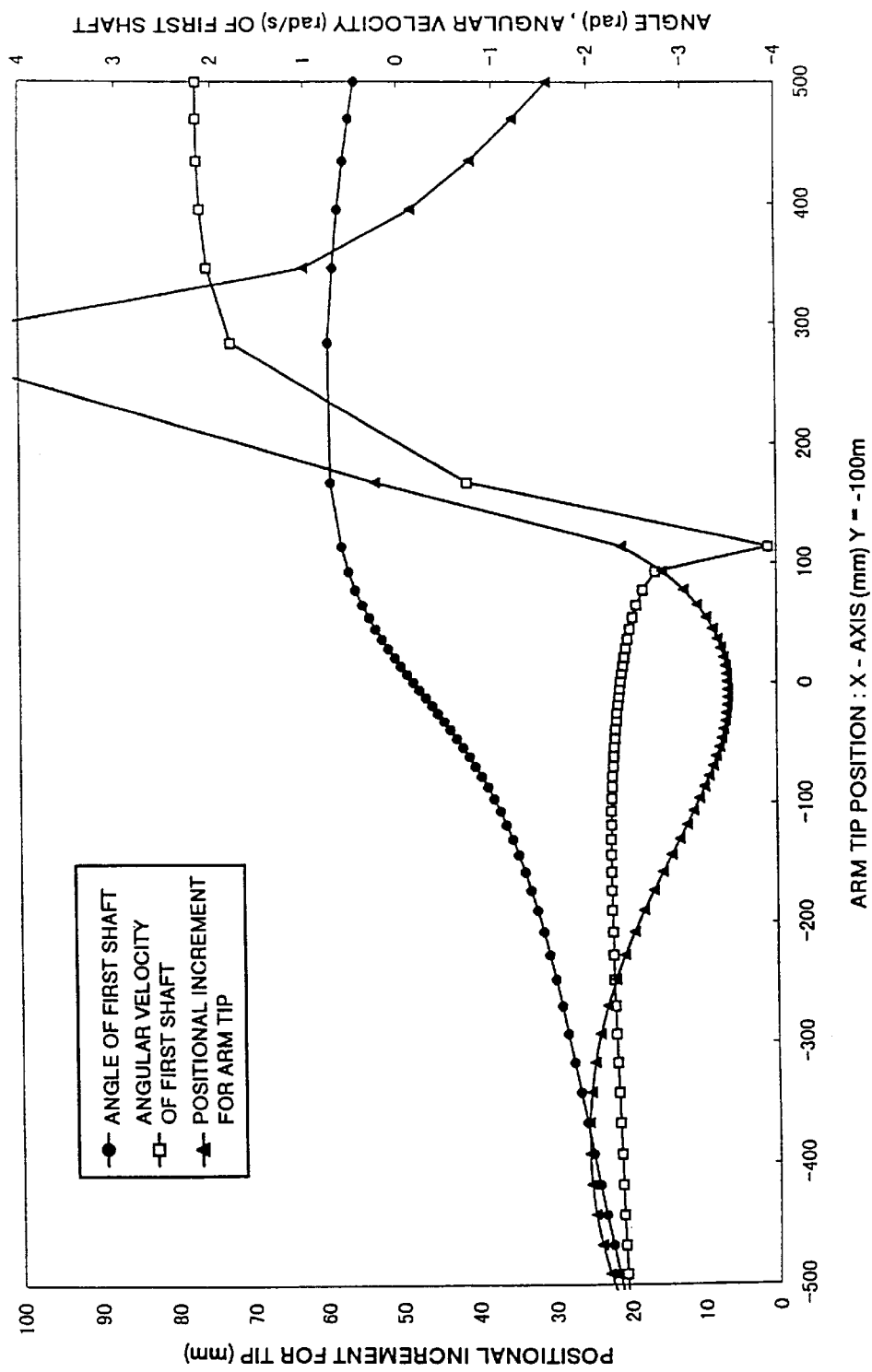
FIG. 16 is a graph showing an arm tip position increment, an angle of the first shaft, and an angular velocity of the first shaft to an arm tip position in a linear interpolating operation a constant angular velocity.
Figure 17:
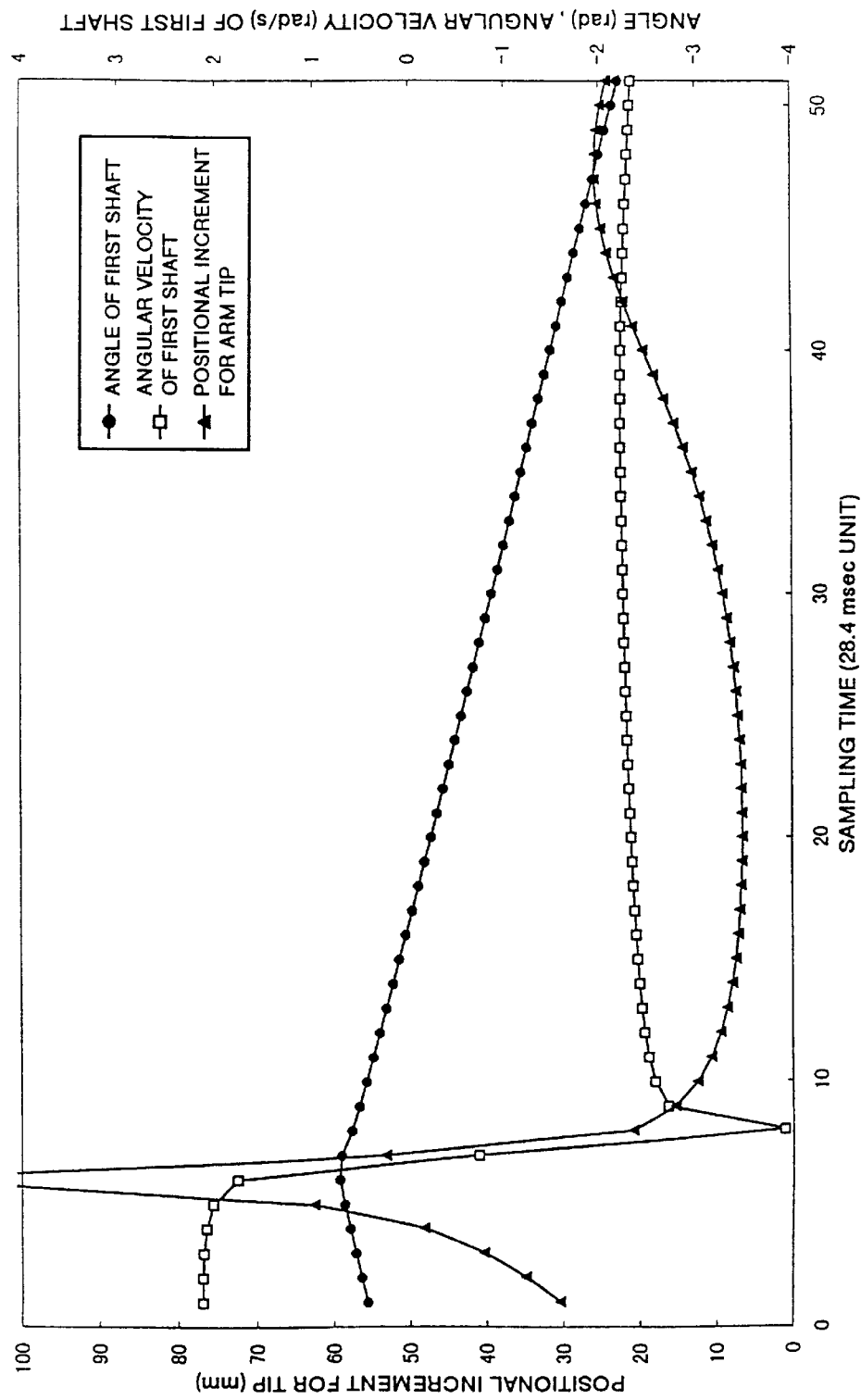
FIG. 17 is a graph showing an arm tip position increment, angle of the first shaft, and an angular velocity of the first shaft to a sampling time in a linear interpolating operation at a constant angular velocity.

The line for the positional increment for the arm tip at each sampling time of the arm tip shaft indicated by the black triangle "▲" is also changed smoothly at the rocking point of which X coordinate is 232 mm, and there is no possibility that the increment is diverged to infinity as shown in FIG. 16 and FIG. 17.

The angular velocity of the first shaft indicated by the white square "□" is also changed smoothly at the rocking point, and there is no possibility that the abrupt change is generated as shown in FIG. 16 and FIG. 17. For this reason, even if the instructed angular velocity $J_1$ is set as a rated maximum angular velocity used in the expression (1), it is possible to operate a robot without generation of excessive angular velocity.

In linear interpolating operation at a constant velocity at the arm tip position, the arm tip is moved requiring 2.56 sec for a 1000 mm segment from the start position (X coordinate: 500 mm; Y coordinate: −100 mm) to the end position (X coordinate: −500 mm; Y coordinate: −100 mm), but when it is controlled at a constant angular velocity, only 1.33 sec is required for completion of the movement.

When the angular velocity is constant, a positional increment is decided through the expression (12), so that three times of addition/subtraction, five of multiplication, one of division, and three of trigonometric-function expression are required to be computed in total, but in the trajectory control method according to the present invention, the amount of computation required for deciding a positional increment are only twice of multiplication and one of trigonometric-function expression. Comparing more specifically the amount of computation therebetween, if the microprocessor 80386 and the expression-value computing processor 80387 each produced by Intel Corp. are used, 45 clocks are required for addition/subtraction, 65 clocks for multiplication, 102 clocks for division, and 771 clocks for trigonometric-function expression, so that 2875 clocks are required for the constant angular velocity system, while in the trajectory control method according to the present invention, only 901 clocks are required for completion of the computation and the time required for it can be reduced to around ⅓ because the division and trigonometric-function expression which are heavily loaded on the computation are a small amount therein.

Figure 6:
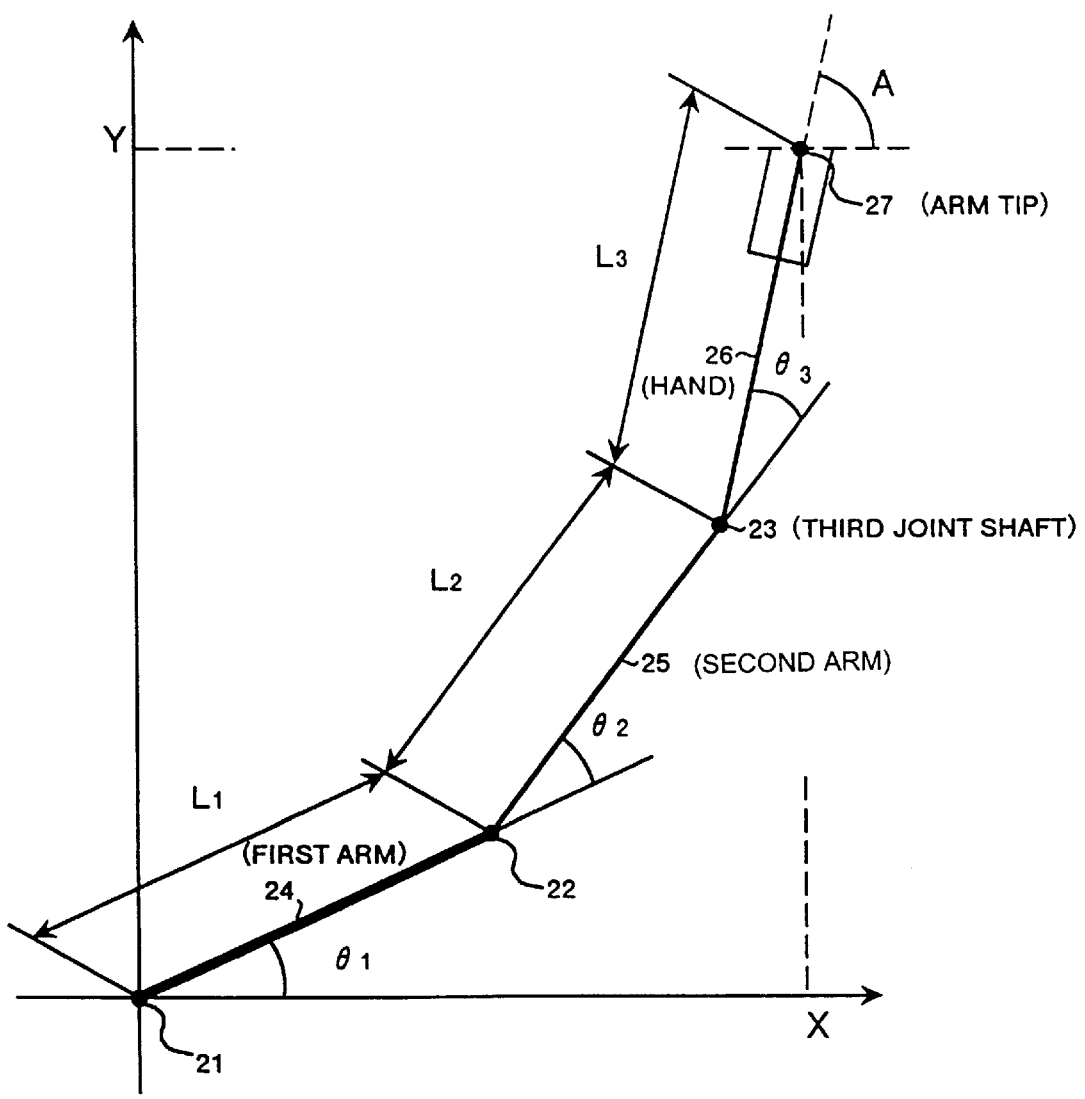
FIG. 6 is a block diagram showing an intra-planar three-freedom SCARA type of robot having a posture axis.
Figure 7:
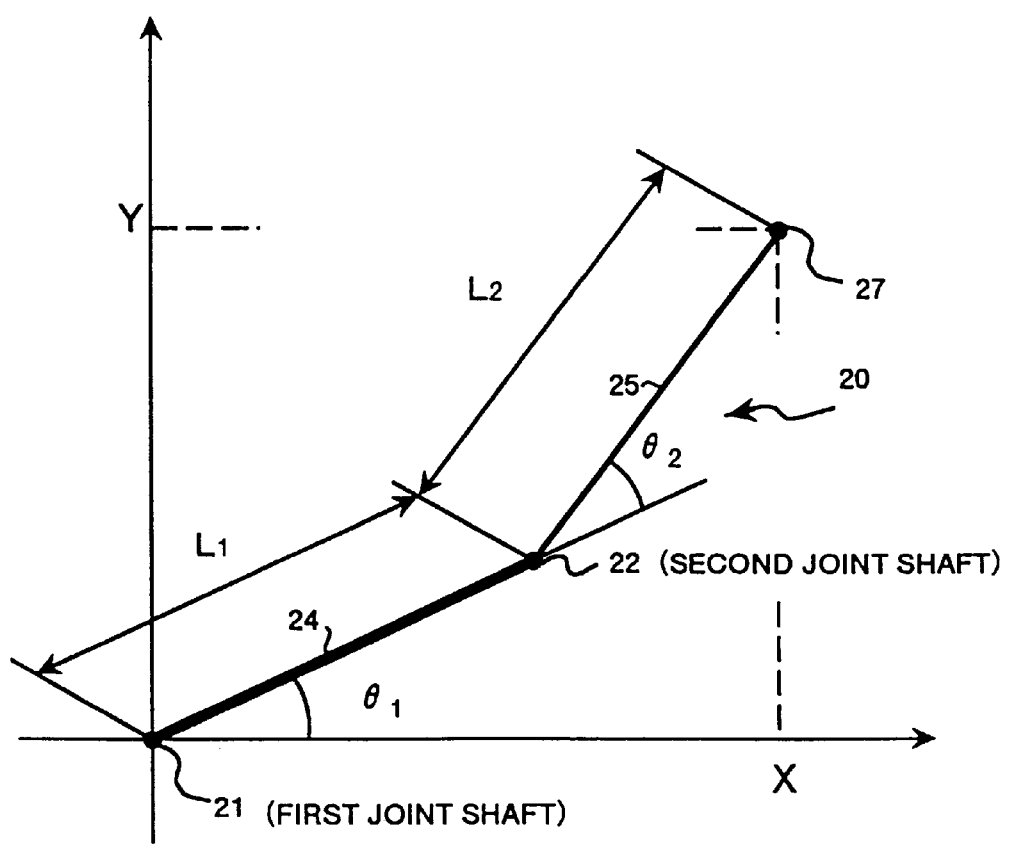
FIG. 7 is a block diagram showing an intra-horizontal planar two-freedom SCARA type of robot.
Figure 8:
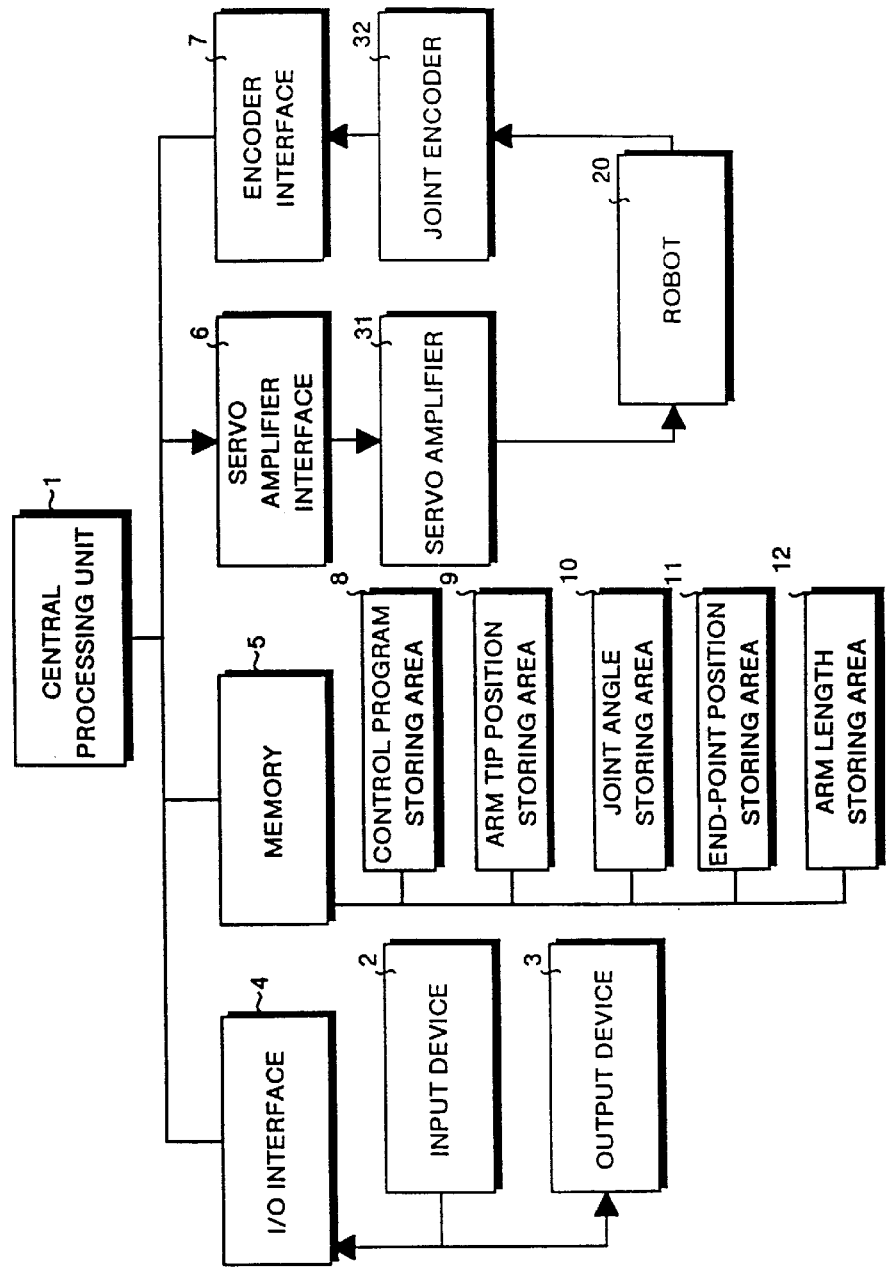
FIG. 8 is a block diagram schematically showing configuration of a robot control apparatus.
Figure 9:
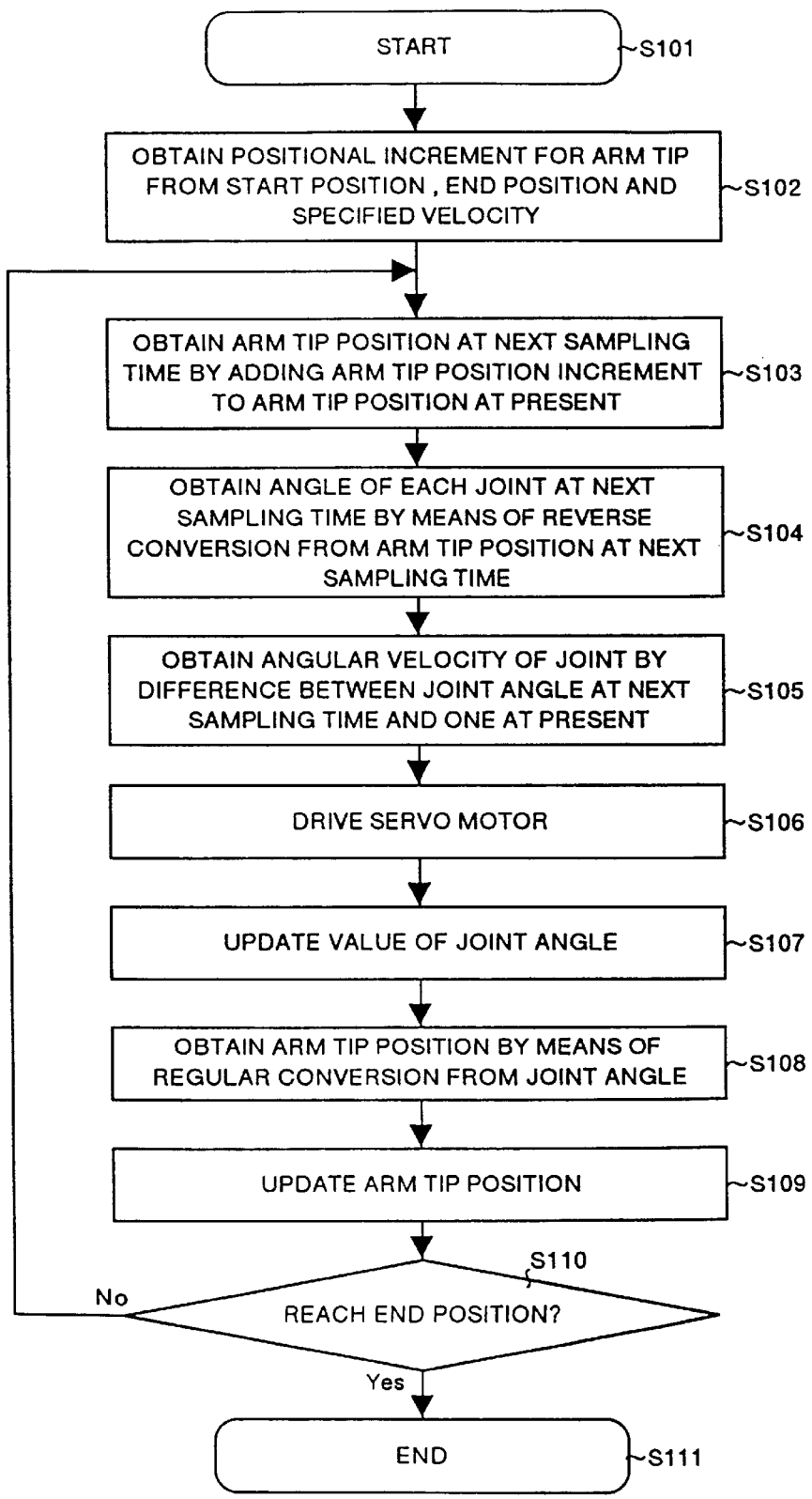
FIG. 9 is a flowchart showing a linear interpolating operation at a constant positional velocity of an arm tip.
Figure 10:
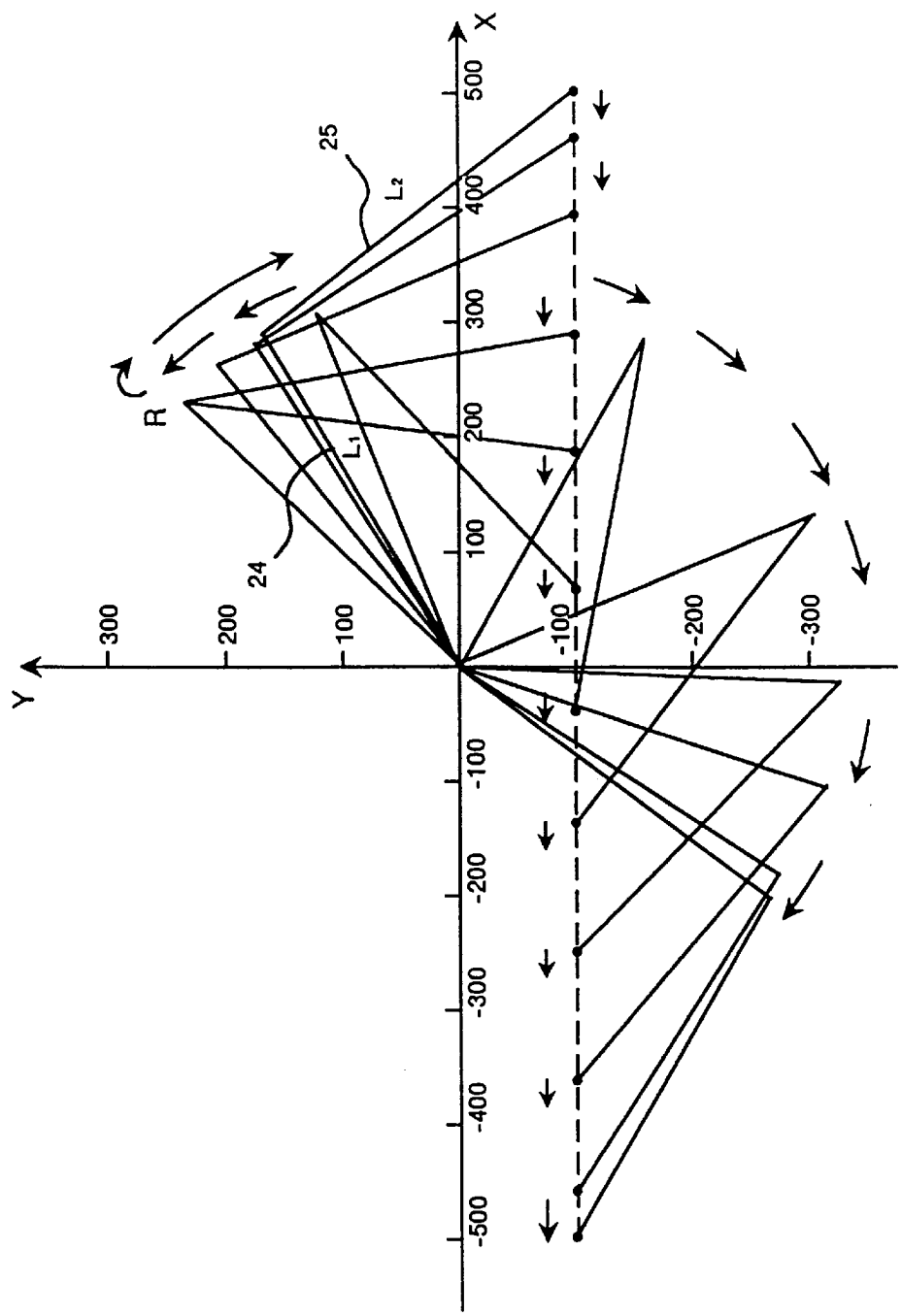
FIG. 10 is an explanatory view showing a path of an arm operation in a linear interpolating operation at a constant positional velocity of an arm tip.
Figure 11:
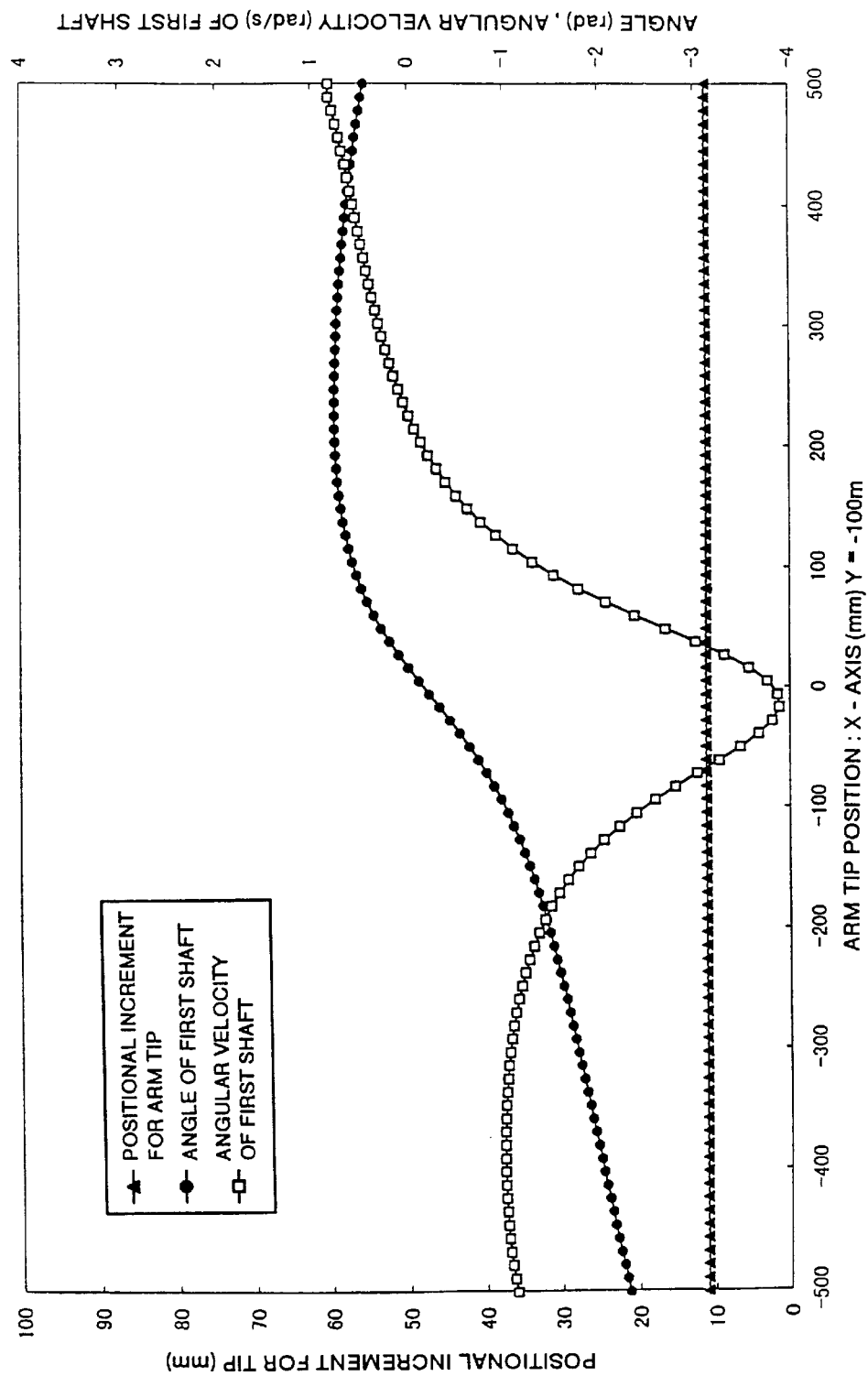
FIG. 11 is a graph showing an arm tip position increment, an angle of the first shaft, and an angular velocity of the first shaft to an arm tip position in a linear interpolating operation at a constant positional velocity of an arm tip.
Figure 12:
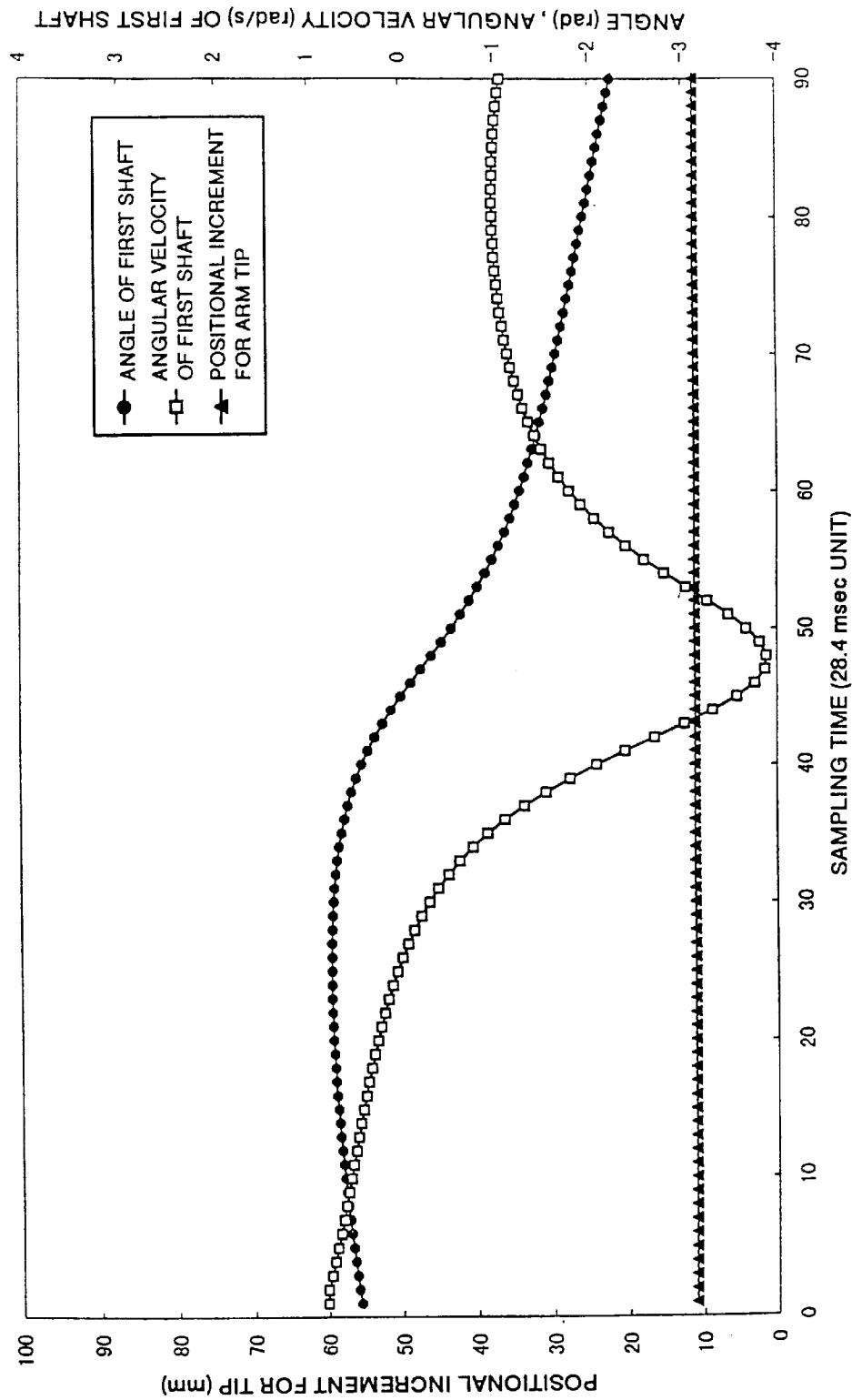
FIG. 12 is a graph showing an arm tip position increment, an angle of the first shaft, and an angular velocity of the first shaft to a sampling time in a linear interpolating operation at a constant positional velocity of an arm tip.

It should be noted that, in the embodiment, the two-freedom SCARA type of robot shown in FIG. 7 according to the present invention is extended to be applied to the three-freedom SCARA type of robot shown in FIG. 6. FIG. 6 shows a robot with one more freedom added thereto by adding a third joint 23 to the arm tip of the two-freedom SCARA type of robot shown in FIG. 7 and driving a hand 26 by the third joint 23, which controls a posture (an angle A) in addition to a position of the arm tip.

Linear interpolation is controlled in this three-freedom SCARA type of robot according to the algorithm shown in FIG. 2. Accordingly, in a case of b, a positional increment for an arm tip is computed and decided through the expression (1).

$$Vn = L_1 \cdot \sin(\theta_2) \cdot J_1 \qquad (1) \text{ (re-introduced)}$$

Herein, description is made for a way to derive the expression (1) in the three-freedom SCARA type of robot.

A term including a position of an arm tip and a posture is called Pose hereinafter according to JIS (Japanese Industrial Standards). In the three-freedom SCARA type of robot shown in FIG. 6, the pose is a vector consisting of three elements such as an X-axial element, an Y-axial element and a posture angle A at a position of an arm tip.

A relation in a rate of time differentiation between a pose of the three-freedom SCARA type of robot and an angle of a joint respectively is expressed by the expression (14).

$$\frac{d}{dt}\begin{pmatrix} x \\ y \\ A \end{pmatrix} = J \cdot \frac{d}{dt}\begin{pmatrix} \theta_1 \\ \theta_2 \\ \theta_3 \end{pmatrix} \qquad (14)$$

wherein J indicates Jacobean matrix indicated by the expression (15).

$$J = \begin{bmatrix} -L_1\sin(\theta_1) - L_2\sin(\theta_1+\theta_2) - L_3\sin(\theta_1+\theta_2+\theta_3) & -L_2\sin(\theta_1+\theta_2) - L_3\sin(\theta_1+\theta_2+\theta_3) & -L_3\sin(\theta_1+\theta_2+\theta_3) \\ L_1\cos(\theta_1) + L_2\cos(\theta_1+\theta_2) + L_3\cos(\theta_1+\theta_2+\theta_3) & L_2\cos(\theta_1+\theta_2) + L_3\cos(\theta_1+\theta_2+\theta_3) & L_3\cos(\theta_1+\theta_2+\theta_3) \\ 1 & 1 & 1 \end{bmatrix} \qquad (15)$$

Accordingly, the reversed relation is expressed by the expression (16).

$$\frac{d}{dt}\begin{pmatrix} \theta_1 \\ \theta_2 \\ \theta_3 \end{pmatrix} = Jr \cdot \frac{d}{dt}\begin{pmatrix} X \\ Y \\ A \end{pmatrix} \qquad (16)$$

wherein Jr indicates reversed Jacobean matrix indicated by the expression (17).

$$Jr := \begin{bmatrix} \frac{\cos(\theta_1+\theta_2)}{L_1\sin(\theta_2)} & \frac{\sin(\theta_1+\theta_2)}{L_1\sin(\theta_2)} & \frac{L_3\sin(\theta_3)}{L_1\sin(\theta_2)} \\ \frac{\cos(\theta_1)}{L_2\sin(\theta_2)} - \frac{\cos(\theta_1+\theta_2)}{L_1\sin(\theta_2)} & \frac{\sin(\theta_1)}{L_2\sin(\theta_2)} - \frac{\sin(\theta_1+\theta_2)}{L_1\sin(\theta_2)} & -\frac{L_3\sin(\theta_2+\theta_3)}{L_2\sin(\theta_2)} - \frac{L_3\sin(\theta_3)}{L_1\sin(\theta_2)} \\ \frac{\cos(\theta_1)}{L_2\sin(\theta_2)} & \frac{\sin(\theta_1)}{L_2\sin(\theta_2)} & 1 + \frac{L_3\sin(\theta_2+\theta_3)}{L_2\sin(\theta_2)} \end{bmatrix} \quad (17)$$

The expression (16) is a trinomial linear simultaneous equations. From the first expression, a relation in time differentiation between an angular velocity of the first shaft and the pose of the arm tip (namely a velocity of the arm tip and an angular velocity of the posture) is expressed by the expression (18).

$$\frac{d\theta_1}{dt} = \frac{\cos(\theta_1+\theta_2)\frac{dx}{dt} + \sin(\theta_1+\theta_2)\frac{dy}{dt} + L_3\sin(\theta_3)\frac{dA}{dt}}{L_1\sin(\theta_2)} \quad (18)$$

wherein $J_1$ indicates an angular increment for the first shaft at each sampling time, Vx indicates a positional increment for an arm tip in the X-axial direction, Vy indicates a positional increment in the Y-axial direction, and $V_A$ indicates an angular increment for a posture shaft. A relation between the angular increment for the first shaft and positional increment for the arm tip pose is expressed by the expression (19).

$$J_1 = \frac{\cos(\theta_1+\theta_2)Vx + \sin(\theta_1+\theta_2)Vy + L_3\sin(\theta_3)V_A}{L_1\sin(\theta_2)} \quad (19)$$

Figure 14:
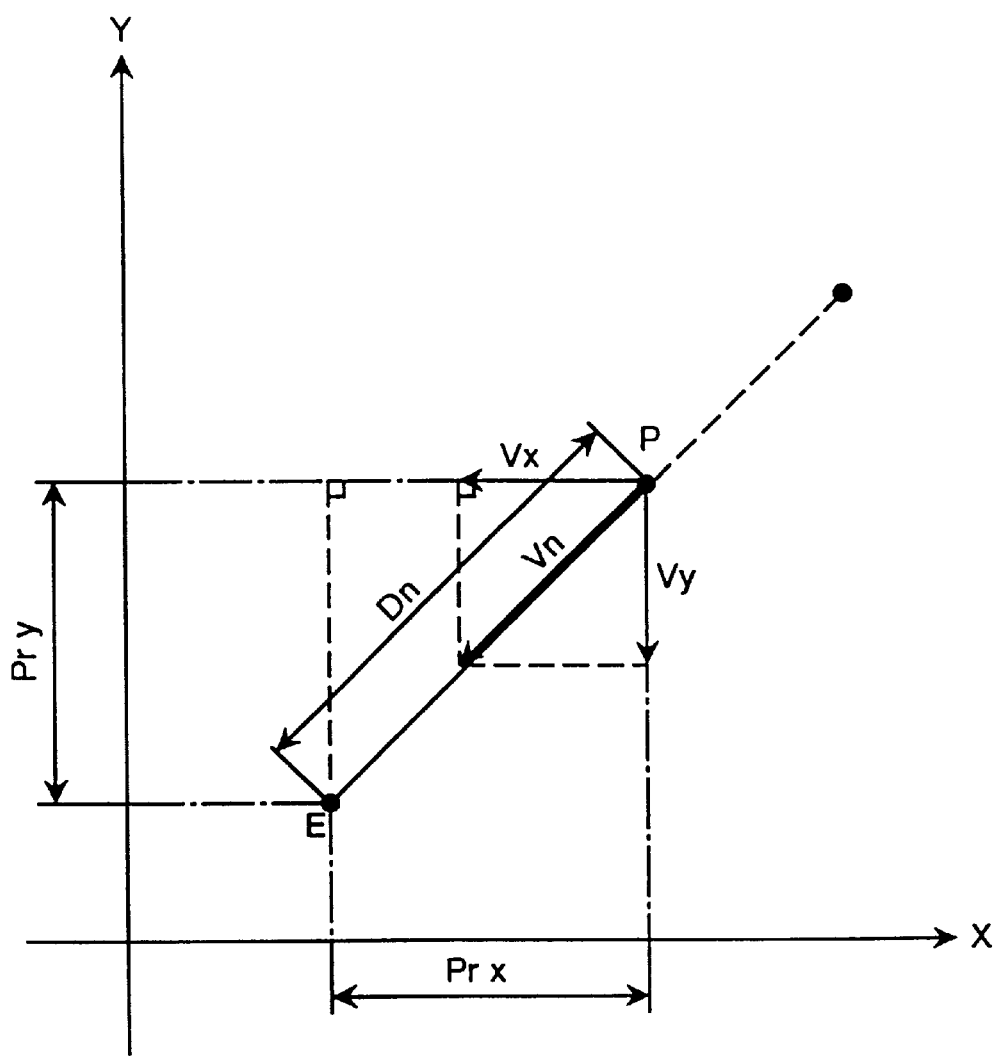
FIG. 14 is an explanatory view showing a positional increment for an arm tip in a linear interpolating operation.
Figure 15:
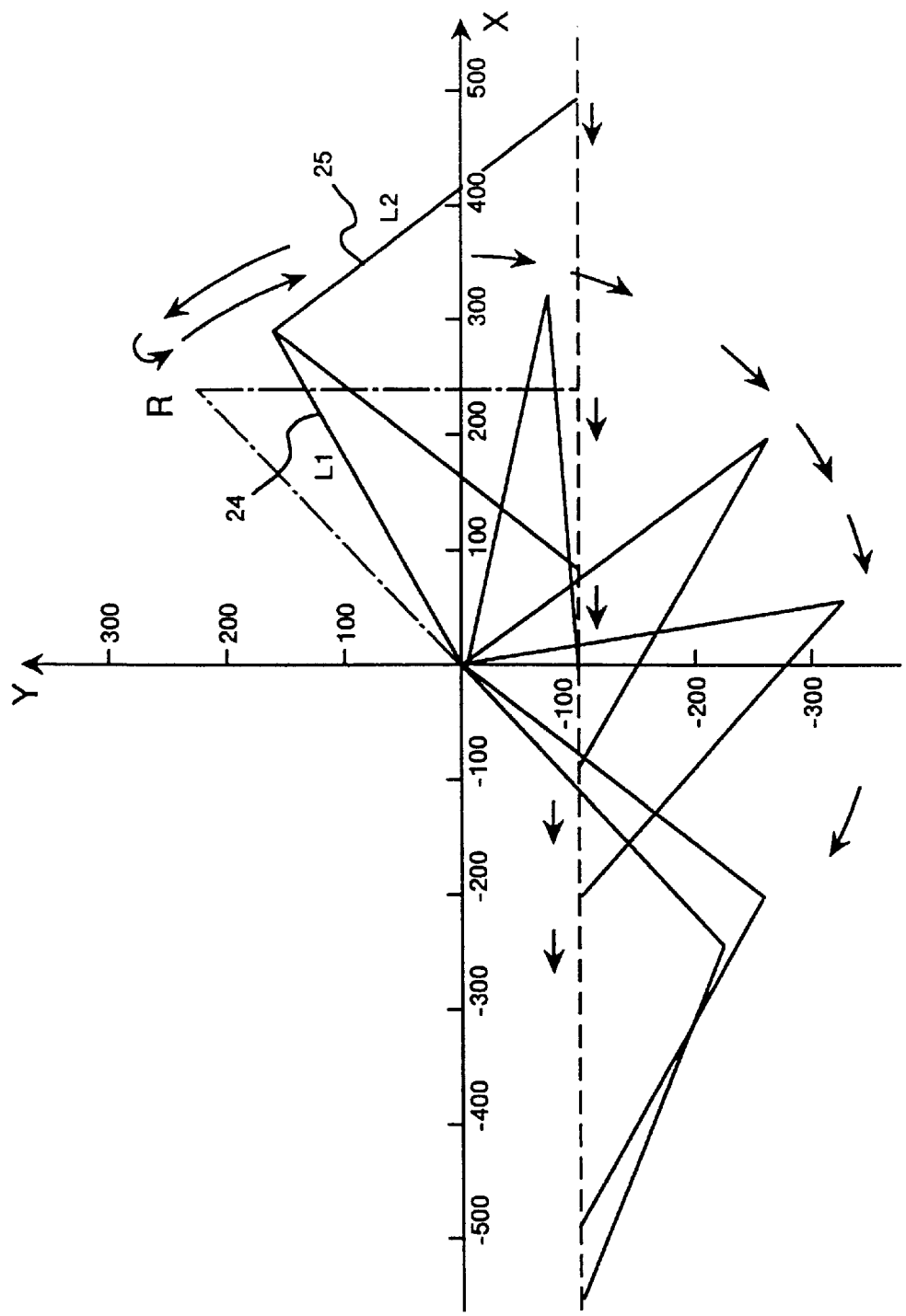
FIG. 15 is an explanatory view showing a path of an arm operation in a linear interpolating operation at a constant angular velocity.

As shown in FIG. 14, in a case of the two-freedom SCARA type of robot, a remaining distance Dn from the specified current position P to the end point is extended in consideration of a posture of the arm tip. The remaining distance Dm to be moved from the current pose to the end point is specified as the expression (20).

$$Dm = \text{Max}\left(\sqrt{Prx^2 + Pry^2}, Pr_A \cdot Jnm\right) \quad (20)$$

wherein, the second term in the parentheses in the right side is obtained by multiplying an angle $V_A$ of a remaining posture by a specified angle=distance conversion coefficient expression Jnm defined in the expression (21). Namely, the expression (21) employs either one with a larger value out of the remaining distance of the arm tip or an angle of the remaining posture as Dmn. This conversion coefficient expression is obtained by dividing a rated maximum velocity Spmax at the arm tip by a rated maximum angular velocity $J_3$ max of the third shaft for controlling the posture.

$$Jnm = \frac{Sp\ \text{max}}{J_3\ \text{max}} \quad (21)$$

A relation of elements between a positional increment Vn for an arm tip and a pose is expressed by the expression (22), expression (23), and expression (24), as in the expression (9) and the expression (10).

$$Vx = Vn \cdot \frac{Prx}{Dm} \quad (22)$$

-continued $$Vy = Vn \cdot \frac{Pry}{Dm} \quad (23)$$

$$V_A = Vn \cdot \frac{Pr_A}{Dm} \quad (24)$$

The expression (25) is obtained by substituting the expressions (22), (23), and (24) into the expression (19).

$$J_1 = \frac{\cos(\theta_1+\theta_2) \cdot Prx + \sin(\theta_1+\theta_2) \cdot Pry + L_3 \cdot \sin(L_3) \cdot Pr_A}{L_1 \cdot \sin(\theta_2)} \cdot \frac{Vn}{Dm} \quad (25)$$

The expression (26) is obtained by solving the above expression for the positional increment Vn for an arm tip.

$$Vn = \frac{L_1 \cdot \sin(\theta_2) \cdot J_1}{\cos(\theta_1+\theta_2) \cdot Prx + \frac{\sin(\theta_1+\theta_2) \cdot Pry + L_3 \cdot \sin(L_3) \cdot Pr_A}{Dm}} \quad (26)$$

This expression corresponds to the expression (12) of the two-freedom SCARA type of robot. The positional increment Vn for an arm tip obtained through the expression is a value obtained by extending a case where linear interpolation is executed at a constant angular velocity like in the expression (12) to the three-freedom SCARA type of robot.

With the expression (26), like in a case of the two-freedom SCARA type of robot, divergence of a positional increment for an arm tip is generated at the rocking point.

This occurs because the section of the denominator in the expression (26) takes a value of zero at the rocking point. The value obtained by dividing the denominator by the extended remaining distance Dm is 1 at the starting position and is zero at the end position, whereby an inequality (the expression (27)) holds good.

$$0 \leq \frac{\cos(\theta_1+\theta_2) \cdot Prx + \sin(\theta_1+\theta_2) \cdot Pry + L_3 \cdot \sin(L_3) \cdot Pr_A}{Dm} \leq 1 \quad (27)$$

wherein, when the term in the expression (27) is replaced for the maximum value of 1 to be substituted in the expression (26), the expression (1) is obtained after all.

In the embodiment described above, a positional increment for an arm tip in a linear operation is decided by the expression (1), so that there is no possibility that a velocity of an arm tip is diverged at the rocking point.

With the expression (26) through which a positional increment for an arm tip is obtained as a constant angular velocity, seven times of multiplication, one of division, twice of addition, and four of trigonometric-function expression are required to be computed, and if the microprocessor 80386 and the expression-value computing processor 80387 each produced by Intel Corp. are used, 3731 clocks are required for the computation. In contrast, with the expression (1), only 901 clocks are required for completion of the computation, whereby a large reduction of time required for the computation can be achieved. With the reduction of computing time, a sampling time can be reduced and improvement of trajectory precision can be expected.

As understood from the above description, in the trajectory control apparatus for an intra-planar multifreedom SCARA type of robot according to the present invention, the first joint angular velocity storing section stores therein an angular velocity of a first joint specified as a parameter for computing increment of an arm tip position, and an arm tip position increment computing section computes for a linear interpolating operation an arm tip position increment by multiplying a length of the first arm by a sine of an angle of a second joint and angular velocity of the first joint stored in the first joint angular velocity storing section to control linear interpolation, so that there is no possibility that a positional increment for an arm tip becomes infinity over the whole operating area for linear interpolation, and high-speed operation thereof can be performed without setting an instructed velocity to a small value when being passed through the rocking point. In addition, a higher angular velocity of the first shaft is not required when the arm tip is passing through any point adjacent to the origin point as required in the linear interpolation based on the conventional technology in which a velocity of an arm tip position is kept constant, and for this reason, an arm tip can be operated at high speed without setting an instructed velocity to a small value to pass through any point adjacent to the origin point. Also, a quantity of computation can be reduced, so that a sampling time can be reduced and improvement of trajectory precision can also be expected.

With the trajectory control apparatus for an intra-planar multifreedom SCARA type of robot according to another feature of the present invention, in the two-freedom or three-freedom SCARA type of robot, the positional increment computing section computes for a linear interpolating operation an arm tip position increment by multiplying a length of the first arm by a sine of an angle of the second joint and angular velocity of the first joint stored in the first joint angular velocity storing section to control linear interpolation, so that there is no possibility that a positional increment for an arm tip becomes infinity over the whole operating area for linear interpolation in the two-freedom or three-freedom SCARA type of robot, and an arm tip can be operated at high speed without setting an instructed velocity to a small value to pass through a rocking point.

With the trajectory control method for an intra-planar multifreedom SCARA type of robot according to another feature of the present invention, linear interpolation is controlled by storing therein an angular velocity of the first joint specified as a parameter for computing an arm tip position increment and by computing for a linear interpolating operation a positional increment for an arm tip by multiplying a length of a first arm by sine of an angle of the second joint and an angular velocity of the first joint, so that there is no possibility that a positional increment for an arm tip becomes infinity over the whole operating area for linear interpolation, and an arm tip can be operated at high speed without setting an instructed velocity to a small value to pass through a rocking point. In addition, a higher angular velocity of the first shaft is not required when the arm tip is passing through any point adjacent to the origin point as required in the linear interpolation based on the conventional technology in which a velocity of an arm tip position is kept constant, and for this reason, an arm tip can be operated at high speed without setting an instructed velocity to a small value to pass through any point adjacent to the origin point. Also, a quantity of computation can be reduced, so that a sampling time can be reduced and improvement of trajectory precision can also be expected.

With the trajectory control method for an intra-planar multifreedom SCARA type of robot according to another feature of the present invention, linear interpolation is controlled by computing a positional increment Vn for an arm tip through the operating expression: $Vn=L_1 \cdot \sin(\theta_2) \cdot J_1$, so that there is no possibility that a positional increment for an arm tip becomes infinity over the whole operating area for linear interpolation, and an arm tip can be operated at high speed without setting an instructed velocity to a small value to pass through a rocking point. In addition, a higher angular velocity of the first shaft is not required when the arm tip is passing through any point adjacent to the original point as required in the linear interpolation based on the conventional technology in which a velocity of an arm tip position is kept constant, and for this reason, an arm tip can be operated at high speed without setting an instructed velocity to a small value to pass through any point adjacent to the origin point. Also, a quantity of computation can be reduced, so that a sampling time can be reduced and improvement of trajectory precision can also be expected.

With the trajectory control method for an intra-planar multifreedom SCARA type of robot according to another feature of the present invention, in the two-freedom or three-freedom SCARA type of robot, the positional increment computing section computes for a linear interpolating operation an arm tip position increment by multiplying a length of the first arm by a sine of an angle of the second joint and an angular velocity of the first joint to control linear interpolation to control linear interpolation, so that there is no possibility that a positional increment for an arm tip becomes infinity over the whole operating area for linear interpolation in the two-freedom or three-freedom SCARA type of robot, and an arm tip can be operated at high speed without setting an instructed velocity to a small value to pass through a rocking point.

With the computer-readable recording medium according to another feature of the present invention, by executing a program stored in the computer-readable recording medium by a computer, linear interpolating operation is executed with no possibility that a positional increment for an arm tip becomes infinity over the-whole operating area for linear interpolation, and an arm tip can be operated at high speed without setting an instructed velocity to a small value to pass through a rocking point. In addition, a higher angular velocity of the first shaft is not required when the arm tip is passing through any point adjacent to the original point as required in the linear interpolation based on the conventional technology in which a velocity of an arm tip position is kept constant, and for this reason, an arm tip can be operated at high speed without setting an instructed velocity to a small value to pass through any point adjacent to the origin point. Also, a quantity of computation can be reduced, so that a sampling time can be reduced and improvement of trajectory precision can also be expected.

This application is based on Japanese patent application No. HEI 9-126110 filed in the Japanese Patent Office on May 15, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A trajectory control apparatus for an intra-planar multifreedom Selective Compliance Assembly Robot Arm (SCARA) robot comprising:
   a first joint angular velocity storing section for storing an angular velocity of a first joint specified as a parameter for computing an arm tip position increment; and
   an arm tip position increment computing section for computing said arm tip position increment, for a linear interpolating operation, by multiplying a length of a first arm by a sine of an angle of a second joint and said angular velocity of the first joint stored in said first joint angular velocity storing section.

2. A trajectory control apparatus for an intra-planar multifreedom SCARA robot according to claim 1, wherein said intra-planar multifreedom SCARA robot is a two-freedom or a three-freedom SCARA robot.

3. A trajectory control method for an intra-planar multifreedom Selective Compliance Assembly Robot Arm (SCARA) robot comprising:

storing an angular velocity of a first joint specified as a parameter for computing an arm tip position increment; and computing said arm tip position increment, for a linear interpolating operation, by multiplying a length of a first arm by a sine of an angle of a second joint as well as by said angular velocity of said first joint.

4. A trajectory control method for an intra-planar multifreedom SCARA robot according to claim 3; wherein said intra-planar multifreedom SCARA robot is a two-freedom or a three freedom SCARA robot.

5. A trajectory control method for an intra-planar multifreedom Selective Compliance Assembly Robot Arm (SCARA) robot in which a positional increment of an arm tip is computed for a linear interpolating operation through the expression (1);

$$Vn = L_1 \cdot \sin(\theta_2) \cdot J_1 \qquad (1)$$

wherein Vn indicates said positional increment of said arm tip; $L_1$ indicates a length of a first arm; $\theta_2$ indicates an angle of a second joint; and $J_1$ indicates an angular velocity of a first joint specified by a user.

6. A trajectory control method for an intra-planar multifreedom SCARA robot according to claim 5; wherein said intra-planar multifreedom SCARA robot is a two-freedom or a three freedom SCARA robot.

7. A computer-readable recording medium with a trajectory control program for an intra-planar multifreedom Selective Compliance Assembly Robot Arm (SCARA) robot stored therein, said trajectory control program executed by a computer and comprising:

a first joint angular velocity storing step of storing a first joint angular velocity specified as a parameter for computing an arm tip position increment; and an arm tip position increment computing step for computing said arm tip position increment, for a linear interpolating operation, by multiplying a length of a first arm by a sine of an angle of a second joint and said first joint angular velocity stored in said first joint angular velocity storing step.

* * * * *